US012155437B2

(12) United States Patent
Huang et al.

(10) Patent No.: US 12,155,437 B2
(45) Date of Patent: Nov. 26, 2024

(54) CHANNEL STATE INFORMATION FEEDBACK IN FULL-DUPLEX

(71) Applicant: QUALCOMM Incorporated, San Diego, CA (US)

(72) Inventors: Min Huang, Beijing (CN); Chao Wei, Beijing (CN); Yu Zhang, Beijing (CN); Qiaoyu Li, Beijing (CN); Liangming Wu, Beijing (CN)

(73) Assignee: QUALCOMM Incorporated, San Diego, CA (US)

( * ) Notice: Subject to any disclaimer, the term of this patent is extended or adjusted under 35 U.S.C. 154(b) by 280 days.

(21) Appl. No.: 17/595,106

(22) PCT Filed: May 18, 2020

(86) PCT No.: PCT/CN2020/090754
§ 371 (c)(1),
(2) Date: Nov. 9, 2021

(87) PCT Pub. No.: WO2020/238662
PCT Pub. Date: Dec. 3, 2020

(65) Prior Publication Data
US 2022/0247467 A1 Aug. 4, 2022

(30) Foreign Application Priority Data

May 30, 2019 (WO) ................ PCT/CN2019/089219

(51) Int. Cl.
*H04W 24/10* (2009.01)
*H04B 7/06* (2006.01)
(Continued)

(52) U.S. Cl.
CPC ......... *H04B 7/0626* (2013.01); *H04L 5/0051* (2013.01); *H04L 5/0053* (2013.01);
(Continued)

(58) Field of Classification Search
None
See application file for complete search history.

(56) References Cited

U.S. PATENT DOCUMENTS

2012/0236736 A1\* 9/2012 Frank .................... H04W 24/04
370/252
2015/0009951 A1\* 1/2015 Josiam ................ H04L 25/0224
370/330
(Continued)

FOREIGN PATENT DOCUMENTS

CN 109151886 A 1/2019
CN 109644039 A 4/2019
(Continued)

OTHER PUBLICATIONS

Supplementary European Search Report—EP20815431—Search Authority—Munich—Jun. 1, 2023, 11 pp.
(Continued)

*Primary Examiner* — Benjamin Lamont
(74) *Attorney, Agent, or Firm* — Paul M. Mcadams; Shumaker & Sieffert, PA

(57) ABSTRACT

Certain aspects of the present disclosure provide techniques for a user equipment (UE) to determine channel state information (CSI) to feedback to a base station (BS) in a full-duplex wireless communications system while considering UE-to-UE interference and for the BS to configure the UE to provide the CSI to the BS. In an exemplary method, a UE receives, from a base station (BS) in a full-duplex communications system, a channel state information (CSI) report configuration including at least a first indicator of a first associated set of sounding reference signal (SRS) resources; and transmits to the BS a CSI report including CSI and zero or more second indicators of sets of measured SRS resources.

11 Claims, 11 Drawing Sheets

(51) Int. Cl.
*H04L 5/00* (2006.01)
*H04W 24/02* (2009.01)
*H04W 72/23* (2023.01)
*H04B 7/0452* (2017.01)

(52) U.S. Cl.
CPC ........... *H04W 24/02* (2013.01); *H04W 24/10* (2013.01); *H04W 72/23* (2023.01); *H04B 7/0452* (2013.01)

(56) References Cited

U.S. PATENT DOCUMENTS

| | | | |
|---|---|---|---|
| 2016/0044689 A1 | 2/2016 | Wen et al. | |
| 2017/0054544 A1* | 2/2017 | Kazmi | H04L 5/14 |
| 2017/0366377 A1* | 12/2017 | Papasakellariou | H04L 5/0053 |
| 2019/0260543 A1 | 8/2019 | Gong et al. | |
| 2020/0120529 A1 | 4/2020 | Wu et al. | |
| 2020/0389805 A1 | 12/2020 | Kim et al. | |
| 2022/0159596 A1* | 5/2022 | Kim | H04B 17/336 |

FOREIGN PATENT DOCUMENTS

| | | |
|---|---|---|
| EP | 3471327 A1 | 4/2019 |
| WO | 2017171746 A1 | 10/2017 |
| WO | 2018058455 A1 | 4/2018 |
| WO | 2018082663 A1 | 5/2018 |
| WO | 2018128297 A1 | 7/2018 |

OTHER PUBLICATIONS

Bai J., et al., "Full-duplex in 5G Small Cell Access: System Design and Performance Aspects," arXiv: 1903.09893v1 [eess.SP], Mar. 23, 2019 (Mar. 23, 2019), pp. 1-7, the whole document.
Haesoon., et al., Resource Split Full Duplex to Mitigate Inter-Cell Interference in Ultra-Dense Small Cell Networks, IEEE Access Jul. 25, 2018 (Jul. 25, 2018) 12 pages, the whole document.
International Search Report and Written Opinion—PCT/CN2020/090754—ISA/EPO—Aug. 18, 2020.
International Search Report and Written Opinion—PCT/CN2019/089219—ISA/EPO—Feb. 26, 2020.
LG Electronics: "Motivation for New SI: Study on Flexible and Full Duplex for NR," 3GPP TSG RAN Meeting #83, RP-190265, Mar. 21, 2019 (Mar. 21, 2019), 11 pages, the whole document.

* cited by examiner

CHANNEL STATE INFORMATION FEEDBACK IN FULL-DUPLEX

CROSS-REFERENCE TO RELATED APPLICATIONS

This application is a national stage application under 35 U.S.C. 371 of PCT/CN2020/090754, filed May 18, 2020, which claims benefit of and priority to Chinese Application No. PCT/CN2019/089219, filed May 30, 2019, which are assigned to the assignee hereof and hereby expressly incorporated by reference herein in their entireties as if fully set forth below and for all applicable purposes.

BACKGROUND

Field of the Disclosure

Aspects of the present disclosure relate to wireless communications, and more particularly, to techniques for a user equipment (UE) to determine channel state information (CSI) to feedback to a base station (BS) in a full-duplex wireless communications system while considering UE-to-UE interference and for the BS to configure the UE to provide the CSI to the BS.

Description of Related Art

Wireless communication systems are widely deployed to provide various telecommunication services such as telephony, video, data, messaging, broadcasts, etc. These wireless communication systems may employ multiple-access technologies capable of supporting communication with multiple users by sharing available system resources (e.g., bandwidth, transmit power, etc.). Examples of such multiple-access systems include 3rd Generation Partnership Project (3GPP) Long Term Evolution (LTE) systems, LTE Advanced (LTE-A) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems, to name a few.

In some examples, a wireless multiple-access communication system may include a number of base stations (BSs), which are each capable of simultaneously supporting communication for multiple communication devices, otherwise known as user equipments (UEs). In an LTE or LTE-A network, a set of one or more base stations may define an eNodeB (eNB). In other examples (e.g., in a next generation, a new radio (NR), or 5G network), a wireless multiple access communication system may include a number of distributed units (DUs) (e.g., edge units (EUs), edge nodes (ENs), radio heads (RHs), smart radio heads (SRHs), transmission reception points (TRPs), etc.) in communication with a number of central units (CUs) (e.g., central nodes (CNs), access node controllers (ANCs), etc.), where a set of one or more DUs, in communication with a CU, may define an access node (e.g., which may be referred to as a BS, next generation NodeB (gNB or gNodeB), TRP, etc.). A BS or DU may communicate with a set of UEs on downlink channels (e.g., for transmissions from a BS or DU to a UE) and uplink channels (e.g., for transmissions from a UE to a BS or DU).

These multiple access technologies have been adopted in various telecommunication standards to provide a common protocol that enables different wireless devices to communicate on a municipal, national, regional, and even global level. New radio (e.g., 5G NR) is an example of an emerging telecommunication standard. NR is a set of enhancements to the LTE mobile standard promulgated by 3GPP. NR is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL). To these ends, NR supports beamforming, multiple-input multiple-output (MIMO) antenna technology, and carrier aggregation.

However, as the demand for mobile broadband access continues to increase, there exists a need for further improvements in NR and LTE technology. Preferably, these improvements should be applicable to other multi-access technologies and the telecommunication standards that employ these technologies.

SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description" one will understand how the features of this disclosure provide advantages that include improved communications between access points and stations in a wireless network.

Certain aspects provide a method for wireless communication that may be performed by a base station (BS). The method generally includes sending, to a first user equipment (UE) in a full-duplex communications system, a channel state information (CSI) report configuration including at least a first indicator of a first associated set of sounding reference signal (SRS) resources; and receiving from the first UE a CSI report including CSI and zero or more second indicators of sets of measured SRS resources.

Certain aspects provide a method for wireless communication that may be performed by a user equipment (UE). The method generally includes receiving, from a base station (BS) in a full-duplex communications system, a channel state information (CSI) report configuration including at least a first indicator of a first associated set of sounding reference signal (SRS) resources; and transmitting to the BS a CSI report including CSI and zero or more second indicators of sets of measured SRS resources.

Certain aspects provide an apparatus for wireless communication. The apparatus generally includes a processor configured to send, to a first user equipment (UE) in a full-duplex communications system, a channel state information (CSI) report configuration including at least a first indicator of a first associated set of sounding reference signal (SRS) resources; and to receive from the first UE a CSI report including CSI and zero or more second indicators of sets of measured SRS resources; and a memory coupled with the processor.

Certain aspects provide an apparatus for wireless communication. The apparatus generally includes a processor configured to receive, from a base station (BS) in a full-duplex communications system, a channel state information (CSI) report configuration including at least a first indicator of a first associated set of sounding reference signal (SRS) resources; and to transmit to the BS a CSI report including CSI and zero or more second indicators of sets of measured SRS resources; and a memory coupled with the processor.

Certain aspects provide an apparatus for wireless communication. The apparatus generally includes means for sending, to a first user equipment (UE) in a full-duplex communications system, a channel state information (CSI) report configuration including at least a first indicator of a first associated set of sounding reference signal (SRS) resources; and means for receiving from the first UE a CSI report including CSI and zero or more second indicators of sets of measured SRS resources.

Certain aspects provide an apparatus for wireless communication. The apparatus generally includes means for receiving, from a base station (BS) in a full-duplex communications system, a channel state information (CSI) report configuration including at least a first indicator of a first associated set of sounding reference signal (SRS) resources; and means for transmitting to the BS a CSI report including CSI and zero or more second indicators of sets of measured SRS resources.

Certain aspects provide a computer-readable medium for wireless communication. The computer-readable medium includes instructions that, when executed by a processing system, cause the processing system to perform operations generally including sending, to a first user equipment (UE) in a full-duplex communications system, a channel state information (CSI) report configuration including at least a first indicator of a first associated set of sounding reference signal (SRS) resources; and receiving from the first UE a CSI report including CSI and zero or more second indicators of sets of measured SRS resources.

Certain aspects provide a computer-readable medium for wireless communication. The computer-readable medium includes instructions that, when executed by a processing system, cause the processing system to perform operations generally including receiving, from a base station (BS) in a full-duplex communications system, a channel state information (CSI) report configuration including at least a first indicator of a first associated set of sounding reference signal (SRS) resources; and transmitting to the BS a CSI report including CSI and zero or more second indicators of sets of measured SRS resources.

To the accomplishment of the foregoing and related ends, the one or more aspects comprise the features hereinafter fully described and particularly pointed out in the claims. The following description and the appended drawings set forth in detail certain illustrative features of the one or more aspects. These features are indicative, however, of but a few of the various ways in which the principles of various aspects may be employed.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the drawings. It is to be noted, however, that the appended drawings illustrate only certain typical aspects of this disclosure and are therefore not to be considered limiting of its scope, for the description may admit to other equally effective aspects.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 1:
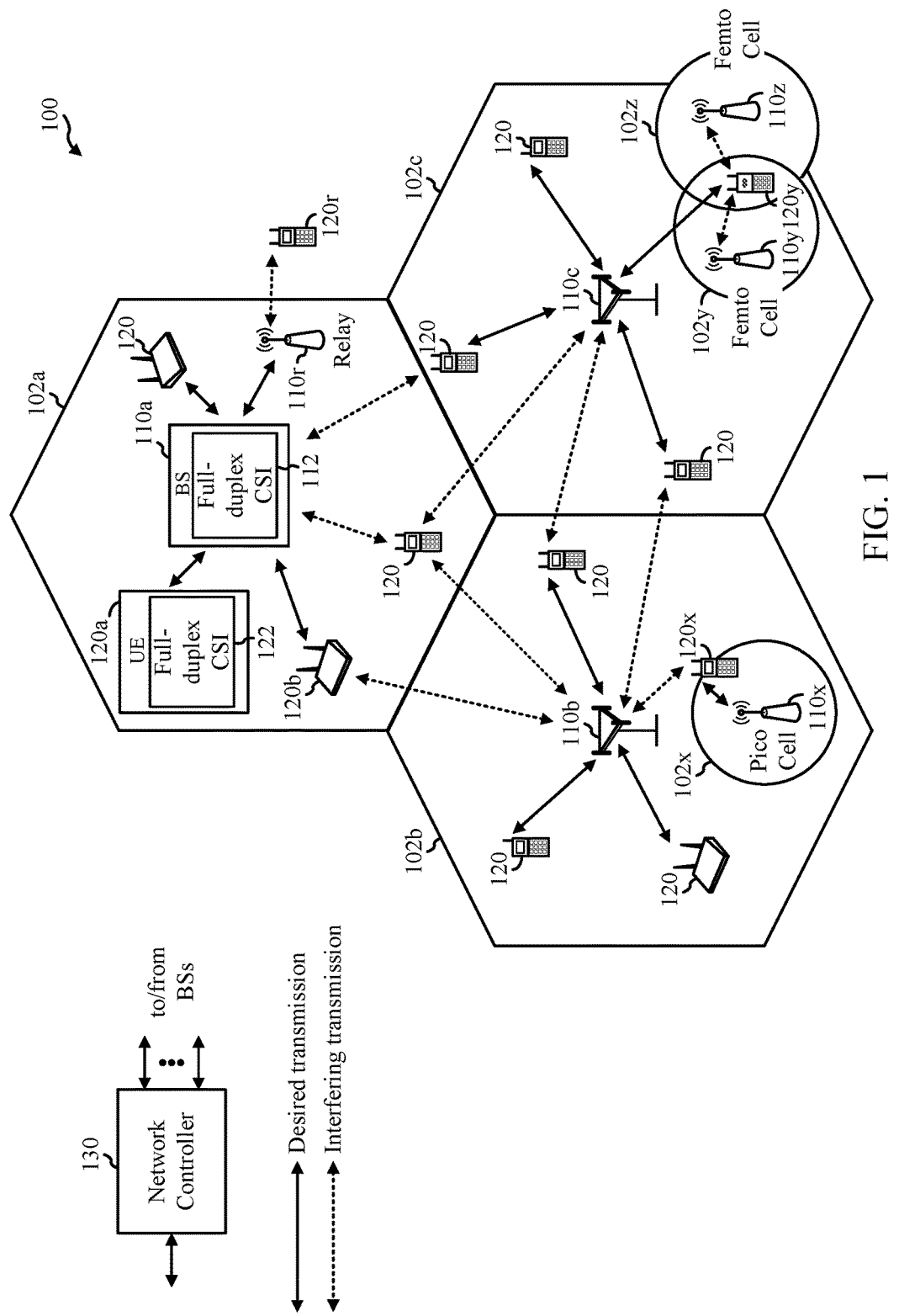
FIG. 1 is a block diagram conceptually illustrating an example telecommunications system, in accordance with certain aspects of the present disclosure.

Aspects of the present disclosure provide apparatus, methods, processing systems, and computer readable mediums for a user equipment (UE) to determine channel state information (CSI) to feedback to a base station (BS) in a full-duplex wireless communications system while considering UE-to-UE interference and for the BS to configure the UE to provide the CSI to the BS.

Fifth generation (5G) wireless networks are expected to provide ultra-high data rates and support a wide scope of application scenarios. Wireless full-duplex (FD) communications is an emerging technique and is theoretically capable of doubling the link capacity when compared with half-duplex communications. The main idea of wireless full-duplex communications is to enable radio network nodes to transmit and receive simultaneously on the same frequency band in the same time slot. This contrasts with conventional half-duplex operation, where transmission and reception either differ in time or in frequency.

According to aspects of the present disclosure, a full-duplex network node, such as a base station in a cellular network, can communicate simultaneously in uplink (UL) and downlink (DL) with two half-duplex terminals (i.e., user equipments (UEs)) using the same radio resources.

In aspects of the present disclosure, a relay node in a wireless full-duplex application can communicate simultaneously with an anchor node and a mobile terminal (e.g., transmitting to the anchor node while receiving from the mobile terminal) in a one-hop scenario, or with two other relay nodes in a multi-hop scenario.

According to aspects of the present disclosure, it is expected that by doubling each single-link capacity, full duplexing can significantly increase the system throughput in diverse applications in wireless communication networks, as compared to previously known techniques, and also reduce the transfer latency for time critical services.

Recent research has demonstrated the feasibility of in-band full-duplex transmission. According to aspects of the present disclosure, it is desirable to develop the capability of canceling strong self-interference from downlink to uplink for use with full-duplex transmissions. Currently known full-duplex radio designs can suppress up to 110 dB of such self-interference by combining the technologies of beamforming, analog cancellation, digital cancellation, and antenna cancellation.

In aspects of the present disclosure, since a UE receiving a downlink (DL) transmission and a UE transmitting an uplink (UL) transmission employ the same time-frequency resource in a full-duplex wireless communication system, if these two UEs are located a short distance from each other, the UL transmission signal may cause serious co-channel interference to the DL signal reception.

Similarly, according to aspects of the present disclosure, a backhaul link and an access link may employ the same time-frequency resource in a full-duplex wireless communication system, and thus if two nodes are located a short distance from each other, communications via the backhaul link and the access link may cause serious co-channel interference with each other.

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method which is practiced using other structure, functionality, or structure and functionality in addition to, or other than, the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspects.

The techniques described herein may be used for various wireless communication technologies, such as 3GPP Long Term Evolution (LTE), LTE-Advanced (LTE-A), code division multiple access (CDMA), time division multiple access (TDMA), frequency division multiple access (FDMA), orthogonal frequency division multiple access (OFDMA), single-carrier frequency division multiple access (SC-FDMA), time division synchronous code division multiple access (TD-SCDMA), and other networks. The terms "network" and "system" are often used interchangeably.

A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). LTE and LTE-A are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2).

New Radio (NR) is an emerging wireless communications technology under development in conjunction with the 5G Technology Forum (5GTF). NR access (e.g., 5G NR) may support various wireless communication services, such as enhanced mobile broadband (eMBB) targeting wide bandwidth (e.g., 80 MHz or beyond), millimeter wave (mmW) targeting high carrier frequency (e.g., 25 GHz or beyond), massive machine type communications MTC (mMTC) targeting non-backward compatible MTC techniques, and/or mission critical targeting ultra-reliable low-latency communications (URLLC). These services may include latency and reliability requirements. These services may also have different transmission time intervals (TTI) to meet respective quality of service (QoS) requirements. In addition, these services may co-exist in the same subframe.

The techniques described herein may be used for the wireless networks and radio technologies mentioned above as well as other wireless networks and radio technologies. For clarity, while aspects may be described herein using terminology commonly associated with 3G and/or 4G wireless technologies, aspects of the present disclosure can be applied in other generation-based communication systems, such as 5G and later, including NR technologies.

FIG. 1 illustrates an example wireless communication network 100 in which aspects of the present disclosure may be performed. For example, the wireless communication network 100 may be a full-duplex NR system (e.g., a full-duplex 5G network). For example, as shown in FIG. 1, the UE 120a has a full-duplex CSI module 122 that may be configured for receiving, from a base station (e.g., BS 110a) in a full-duplex communications system, a channel state information (CSI) report configuration including at least a first indicator of a first associated set of sounding reference signal (SRS) resources (i.e., a set of time-frequency resources); and transmitting to the BS a CSI report including CSI and zero or more second indicators of sets of measured SRS resources, according to aspects described herein. For example, as shown in FIG. 1, the BS 110a has a full-duplex CSI module 112 that may be configured for sending, to a first user equipment (UE, e.g., UE 120a) in a full-duplex communications system, a channel state information (CSI) report configuration including at least a first indicator of a first associated set of sounding reference signal (SRS) resources (e.g., an SRS resource on which UE 120b transmits an SRS); and receiving from the first UE a CSI report including CSI and zero or more second indicators of sets of measured SRS resources, according to aspects described herein.

As illustrated in FIG. 1, the wireless communication network 100 may include a number of base stations (BSs) 110 and other network entities. A BS may be a station that communicates with user equipments (UEs). Each BS 110 may provide communication coverage for a particular geographic area. In 3GPP, the term "cell" can refer to a coverage area of a Node B (NB) and/or a NB subsystem serving this coverage area, depending on the context in which the term is used. In NR systems, the term "cell" and BS, next generation NodeB (gNB or gNodeB), access point (AP), distributed unit (DU), carrier, or transmission reception point (TRP) may be used interchangeably. In some examples, a cell may not necessarily be stationary, and the geographic area of the cell may move according to the location of a mobile BS. In some examples, the BSs may be interconnected to one another and/or to one or more other BSs or network nodes (not shown) in wireless communication network 100 through various types of backhaul interfaces, such as a direct physical connection, a wireless connection, a virtual network, or the like using any suitable transport network.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a subcarrier, a frequency channel, a tone, a subband, etc. Each frequency may support a single RAT in a given geographic area in order to avoid interference between wireless networks of different RATs. In some cases, NR or 5G RAT networks may be deployed.

A BS may provide communication coverage for a macro cell, a pico cell, a femto cell, and/or other types of cells. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having an association with the femto cell (e.g., UEs in a Closed Subscriber Group (CSG), UEs for users in the home, etc.). A BS for a macro cell may be referred to as a macro BS. A BS for a pico cell may be referred to as a pico BS. A BS for a femto cell may be referred to as a femto BS or a home BS. In the example shown in FIG. 1, the BSs 110a, 110b and 110c may be macro BSs for the macro cells 102a, 102b and 102c, respectively. The BS 110x may be a pico BS for a pico cell 102x. The BSs 110y and 110z may be femto BSs for the femto cells 102y and 102z, respectively. A BS may support one or multiple (e.g., three) cells.

Wireless communication network 100 may also include relay stations. A relay station is a station that receives a transmission of data and/or other information from an upstream station (e.g., a BS or a UE) and sends a transmission of the data and/or other information to a downstream station (e.g., a UE or a BS). A relay station may also be a UE that relays transmissions for other UEs. In the example shown in FIG. 1, a relay station 110r may communicate with the BS 110a and a UE 120r in order to facilitate communication between the BS 110a and the UE 120r. A relay station may also be referred to as a relay BS, a relay, etc.

Wireless communication network 100 may be a heterogeneous network that includes BSs of different types, e.g., macro BS, pico BS, femto BS, relays, etc. These different types of BSs may have different transmit power levels, different coverage areas, and different impact on interference in the wireless communication network 100. For example, macro BS may have a high transmit power level (e.g., 20 Watts) whereas pico BS, femto BS, and relays may have a lower transmit power level (e.g., 1 Watt).

Wireless communication network 100 may support synchronous or asynchronous operation. For synchronous operation, the BSs may have similar frame timing, and transmissions from different BSs may be approximately aligned in time. For asynchronous operation, the BSs may have different frame timing, and transmissions from different BSs may not be aligned in time. The techniques described herein may be used for both synchronous and asynchronous operation.

A network controller 130 may couple to a set of BSs and provide coordination and control for these BSs. The network controller 130 may communicate with the BSs 110 via a backhaul. The BSs 110 may also communicate with one another (e.g., directly or indirectly) via wireless or wireline backhaul.

The UEs 120 (e.g., 120a, 120b, 120x, 120y, etc.) may be dispersed throughout the wireless communication network 100, and each UE may be stationary or mobile. A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet computer, a camera, a gaming device, a netbook, a smartbook, an ultrabook, an appliance, a medical device or medical equipment, a biometric sensor/device, a wearable device such as a smart watch, smart clothing, smart glasses, a smart wrist band, smart jewelry (e.g., a smart ring, a smart bracelet, etc.), an entertainment device (e.g., a music device, a video device, a satellite radio, etc.), a vehicular component or sensor, a smart meter/sensor, industrial manufacturing equipment, a global positioning system device, or any other suitable device that is configured to communicate via a wireless or wired medium. Some UEs may be considered machine-type communication (MTC) devices or evolved MTC (eMTC) devices. MTC and eMTC UEs include, for example, robots, drones, remote devices, sensors, meters, monitors, location tags, etc., that may communicate with a BS, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, which may be narrowband IoT (NB-IoT) devices.

Certain wireless networks (e.g., LTE) utilize orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (called a "resource block" (RB)) may be 12 subcarriers (or 180 kHz). Consequently, the nominal Fast Fourier Transfer (FFT) size may be equal to 128, 256, 512, 1024 or 2048 for system bandwidth of 1.25, 2.5, 5, 10, or 20 megahertz (MHz), respectively. The system bandwidth may also be partitioned into subbands. For example, a subband may cover 1.08 MHz (e.g., 6 RBs), and there may be 1, 2, 4, 8, or 16 subbands for system bandwidth of 1.25, 2.5, 5, 10 or 20 MHz, respectively. In LTE, the basic transmission time interval (TTI) or packet duration is the 1 ms subframe. In NR, a subframe is still 1 ms, but the basic TTI is referred to as a slot. A subframe contains a variable number of slots (e.g., 1, 2, 4, 8, 16, ... slots) depending on the subcarrier spacing. The NR RB is 12 consecutive frequency subcarriers. NR may support a base subcarrier spacing of 15 KHz and other subcarrier spacing may be defined with respect to the base subcarrier spacing, for example, 30 kHz, 60 kHz, 120 kHz, 240 kHz, etc. The symbol and slot lengths scale with the subcarrier spacing. The CP length also depends on the subcarrier spacing.

NR may utilize OFDM with a CP on the uplink and downlink and include support for half-duplex operation using TDD. Beamforming may be supported and beam direction may be dynamically configured. MIMO transmissions with precoding may also be supported. In some examples, MIMO configurations in the DL may support up to 8 transmit antennas with multi-layer DL transmissions up to 8 streams and up to 2 streams per UE. In some examples, multi-layer transmissions with up to 2 streams per UE may be supported. Aggregation of multiple cells may be supported with up to 8 serving cells.

In some examples, access to the air interface may be scheduled. A scheduling entity (e.g., a BS) allocates resources for communication among some or all devices and equipment within its service area or cell. The scheduling entity may be responsible for scheduling, assigning, reconfiguring, and releasing resources for one or more subordinate entities. That is, for scheduled communication, subordinate entities utilize resources allocated by the scheduling entity. Base stations are not the only entities that may function as a scheduling entity. In some examples, a UE may function as a scheduling entity and may schedule resources for one or more subordinate entities (e.g., one or more other UEs), and the other UEs may utilize the resources scheduled by the UE for wireless communication. In some examples, a UE may function as a scheduling entity in a peer-to-peer (P2P) network, and/or in a mesh network. In a mesh network example, UEs may communicate directly with one another in addition to communicating with a scheduling entity.

In some examples, two or more subordinate entities (e.g., UEs) may communicate with each other using sidelink signals. Real-world applications of such sidelink communications may include public safety, proximity services, UE-to-network relaying, vehicle-to-vehicle (V2V) communications, Internet of Everything (IoE) communications, IoT communications, mission-critical mesh, and/or various other suitable applications. Generally, a sidelink signal may refer to a signal communicated from one subordinate entity (e.g., UE1) to another subordinate entity (e.g., UE2) without relaying that communication through the scheduling entity (e.g., UE or BS), even though the scheduling entity may be utilized for scheduling and/or control purposes. In some examples, the sidelink signals may be communicated using a licensed spectrum (unlike wireless local area networks, which typically use an unlicensed spectrum).

In FIG. 1, a solid line with double arrows indicates desired transmissions between a UE and a serving BS, which is a BS designated to serve the UE on the downlink and/or uplink. A finely dashed line with double arrows indicates potentially interfering transmissions between a UE and a BS.

Figure 2:
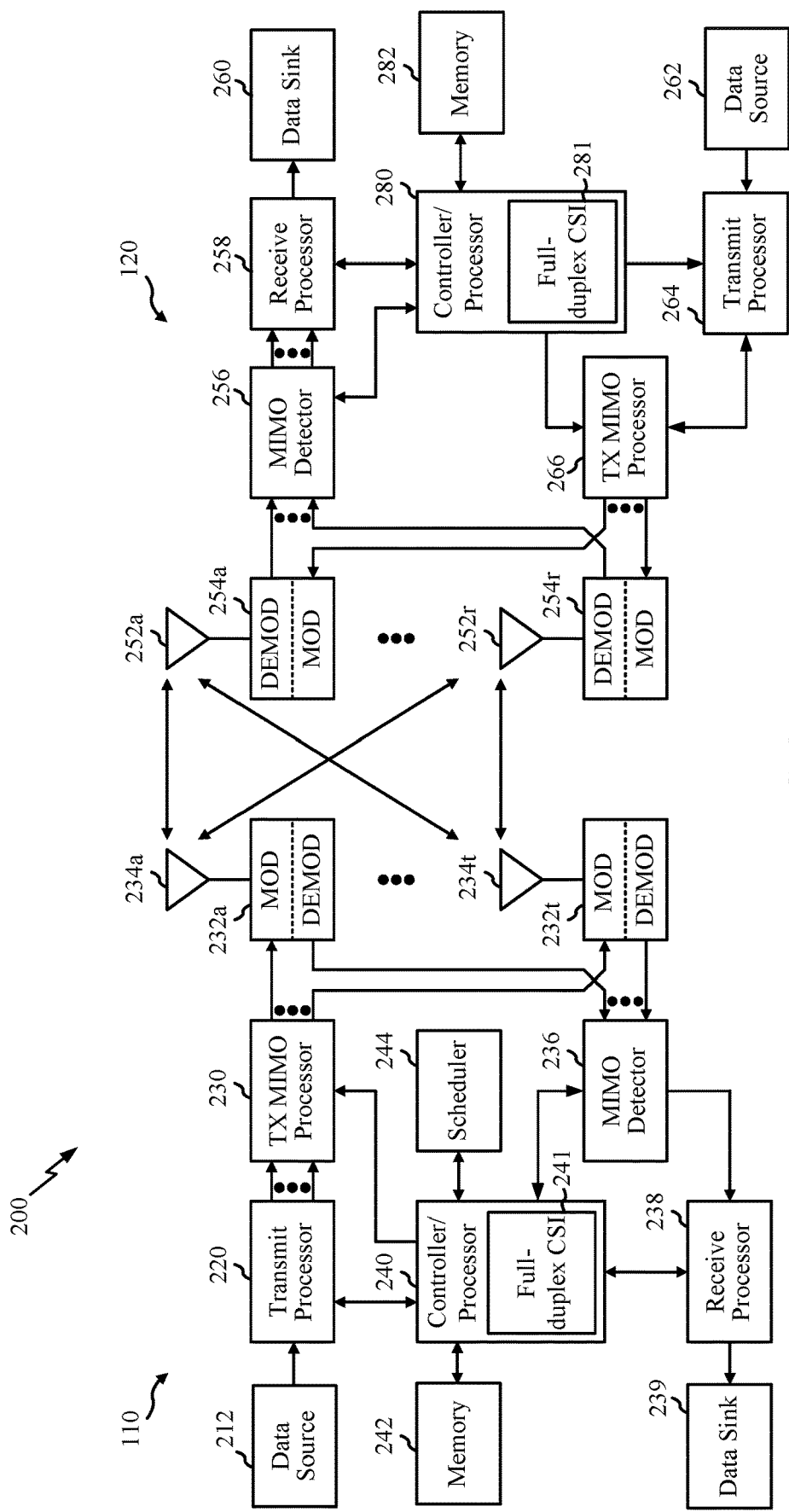
FIG. 2 is a block diagram illustrating an example architecture of a distributed radio access network (RAN), in accordance with certain aspects of the present disclosure.

FIG. 2 illustrates example components of BS 110 and UE 120 (e.g., in the wireless communication network 100 of FIG. 1), which may be used to implement aspects of the present disclosure. For example, antennas 252, processors 266, 258, 264, and/or controller/processor 280 of the UE 120 and/or antennas 234, processors 220, 230, 238, and/or controller/processor 240 of the BS 110 may be used to perform the various techniques and methods described herein. For example, as shown in FIG. 4, the controller/processor 240 of the BS 110 has a full-duplex CSI module 241 that may be configured for sending, to a first user equipment (UE) in a full-duplex communications system, a channel state information (CSI) report configuration including at least a first indicator of a first associated set of sounding reference signal (SRS) resources (e.g., an SRS resource on which UE 120b transmits an SRS); and receiving from the first UE a CSI report including CSI and zero or more second indicators of sets of measured SRS resources, according to aspects described herein. For example, as shown in FIG. 4, the controller/processor 280 of the UE 120 has a full-duplex CSI module 281 that may be configured for receiving, from a base station (BS) in a full-duplex communications system, a channel state information (CSI) report configuration including at least a first indicator of a first associated set of sounding reference signal (SRS) resources (i.e., a set of time-frequency resources); and transmitting to the BS a CSI report including CSI and zero or more second indicators of sets of measured SRS resources.

At the BS 110, a transmit processor 220 may receive data from a data source 212 and control information from a controller/processor 240. The control information may be for the physical broadcast channel (PBCH), physical control format indicator channel (PCFICH), physical hybrid ARQ indicator channel (PHICH), physical downlink control channel (PDCCH), group common PDCCH (GC PDCCH), etc. The data may be for the physical downlink shared channel (PDSCH), etc. The processor 220 may process (e.g., encode and symbol map) the data and control information to obtain data symbols and control symbols, respectively. The transmit processor 220 may also generate reference symbols, such as for the primary synchronization signal (PSS), secondary synchronization signal (SSS), and cell-specific reference signal (CRS). A transmit (TX) multiple-input multiple-output (MIMO) processor 230 may perform spatial processing (e.g., precoding) on the data symbols, the control symbols, and/or the reference symbols, if applicable, and may provide output symbol streams to the modulators (MODs) 232a-232t. Each modulator 232 may process a respective output symbol stream (e.g., for OFDM, etc.) to obtain an output sample stream. Each modulator may further process (e.g., convert to analog, amplify, filter, and upconvert) the output sample stream to obtain a downlink signal. Downlink signals from modulators 232a-232t may be transmitted via the antennas 234a-234t, respectively.

At the UE 120, the antennas 252a-252r may receive the downlink signals from the BS 110 and may provide received signals to the demodulators (DEMODs) in transceivers 254a-254r, respectively. Each demodulator 254 may condition (e.g., filter, amplify, downconvert, and digitize) a respective received signal to obtain input samples. Each demodulator may further process the input samples (e.g., for OFDM, etc.) to obtain received symbols. A MIMO detector 256 may obtain received symbols from all the demodulators 254a-254r, perform MIMO detection on the received symbols if applicable, and provide detected symbols. A receive processor 258 may process (e.g., demodulate, deinterleave, and decode) the detected symbols, provide decoded data for the UE 120 to a data sink 260, and provide decoded control information to a controller/processor 280.

On the uplink, at UE 120, a transmit processor 264 may receive and process data (e.g., for the physical uplink shared channel (PUSCH)) from a data source 262 and control information (e.g., for the physical uplink control channel (PUCCH) from the controller/processor 280. The transmit processor 264 may also generate reference symbols for a reference signal (e.g., for the sounding reference signal (SRS)). The symbols from the transmit processor 264 may be precoded by a TX MIMO processor 266 if applicable, further processed by the demodulators in transceivers 254a-254r (e.g., for SC-FDM, etc.), and transmitted to the base station 110. At the BS 110, the uplink signals from the UE 120 may be received by the antennas 234, processed by the modulators 232, detected by a MIMO detector 236 if applicable, and further processed by a receive processor 238 to obtain decoded data and control information sent by the UE 120. The receive processor 238 may provide the decoded data to a data sink 239 and the decoded control information to the controller/processor 240.

The controllers/processors 240 and 280 may direct the operation at the BS 110 and the UE 120, respectively. The controller/processor 240 and/or other processors and modules at the BS 110 may perform or direct the execution of processes for the techniques described in FIGS. 8-9 and elsewhere herein. The memories 242 and 282 may store data and program codes for BS 110 and UE 120, respectively. A scheduler 244 may schedule UEs for data transmission on the downlink and/or uplink.

Example Channel State Information Feedback in Full-Duplex

Figure 3:
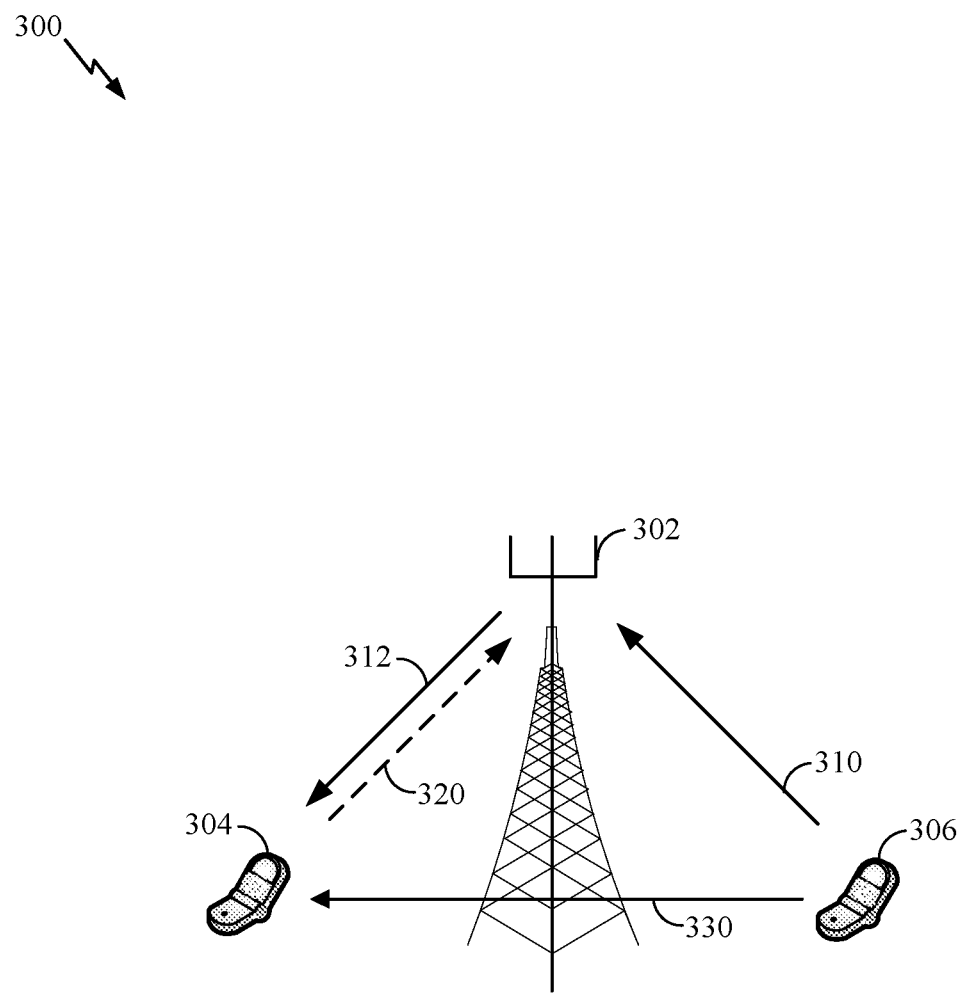
FIG. 3 shows an exemplary system model of a Uu interface interaction in a cell using a full-duplex technique, in accordance with certain aspects of the present disclosure.

FIG. 3 shows an exemplary system model 300 of a Uu interface interaction in a cell using a full-duplex technique, according to aspects of the present disclosure. With the full-duplex technique, downlink transmissions and uplink transmissions can coexist in the same radio spectrum (i.e., the same frequency band) simultaneously in a Uu interface of a cell. In the example, in uplink, UE 306 (which may be an example of a UE 120, shown in FIG. 1) transmits a signal 310 to base station 302 (which may be an example of BS 110a, shown in FIG. 1) with transmit power $P_{tx}$ dB. In downlink, UE 304 (which may also be an example of a UE 120) receives a signal 312 from the base station with receive power $P_{rx}$ dB. The UE 304 measures the channel (i.e., the interference-plus-noise power spectrum) from the base station, determines CSI, and sends an aperiodic (i.e., in response to a command from the base station) or a periodic CSI report 320 to the base station. The base station transmits a downlink signal 312 according to a transport format determined by the base station based on the CSI 320 reported to the base station by the UE 304.

In aspects of the present disclosure, if the propagation loss from UE 306 to UE 304 is D dB, then the UE-to-UE interference (i.e., from the UL transmission to the DL transmission) 330 is $P_{tx}$–D dB. If the UE-to-UE interference power spectrum is larger than the original interference-plus-noise power spectrum at UE 304, then the UE-to-UE interference may impair the reception performance of the UE 304 in receiving the downlink signal 312.

According to aspect of the present disclosure, in full duplex, a UE that generates UE-to-UE interference by sending an UL transmission is referred to as an aggressor UE (e.g., UE 306), while a UE that suffers from UE-to-UE interference is referred to as a victim UE (e.g., UE 304).

Figure 4A:
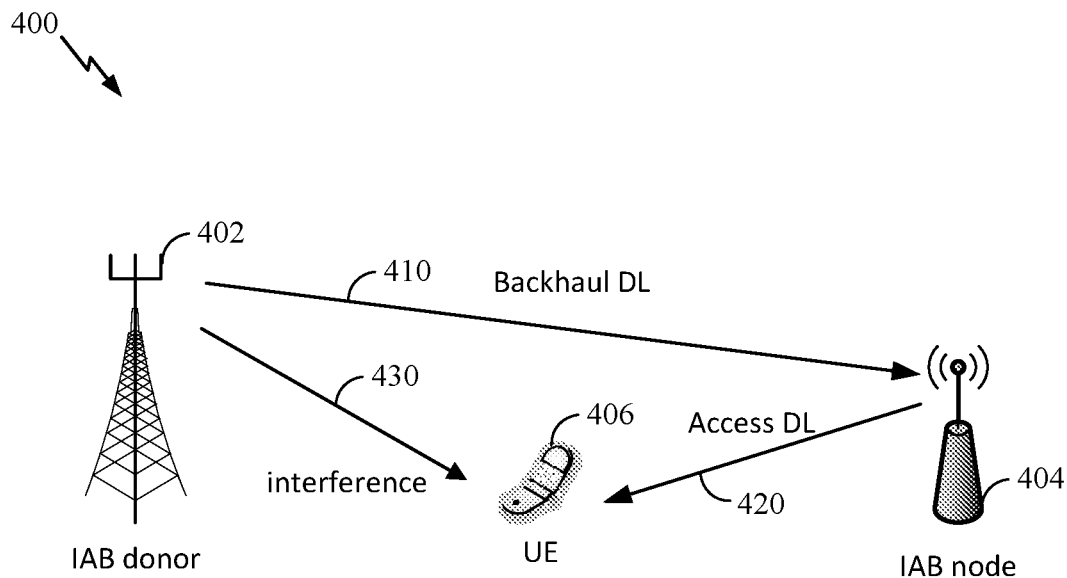
FIGS. 4A & 4B show an exemplary system model of a full-duplex wireless communications system using an integrated access and backhaul (IAB) node, in accordance with certain aspects of the present disclosure.
Figure 4B:
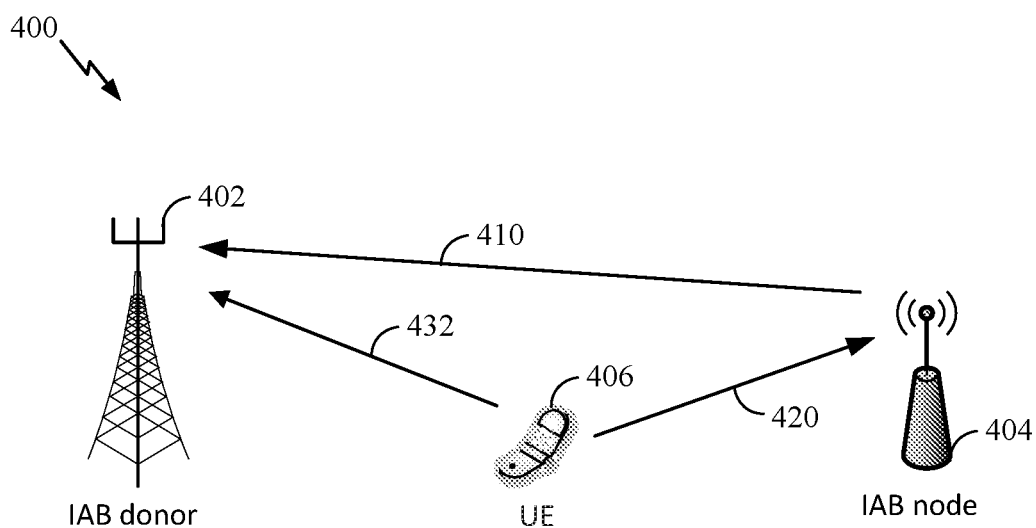

FIGS. 4A & 4B show an exemplary system model 400 of a full-duplex wireless communications system using an integrated access and backhaul (IAB) node 404, according to aspects of the present disclosure. An IAB node 404 (which may be an example of BS 110a, shown in FIG. 1) can be regarded as a relay node through which data can be transmitted from an IAB donor 402 (which may be an example of a BS 110, shown in FIG. 1) to a UE 406 (which may be an example of UE 120a, shown in FIG. 1), as in FIG. 4A, or from the UE to the IAB donor, as in FIG. 4B. With the full-duplex technique, the IAB node 404 can receive first data from an IAB donor 402 via a downlink portion of a backhaul link 410 using a set of time-frequency radio resources and transmit the first data to the UE 406 via a downlink portion of an access link 420 using the same set of time-frequency radio resources, as shown in FIG. 4A. Also with the full-duplex technique, the IAB node 404 can receive second data from the UE 406 via an uplink portion of the access link 420 using the set of time-frequency radio resources and transmit the second data to the IAB donor 402 via an uplink portion of the backhaul link 410 while using the same time-frequency radio resources, as shown in FIG. 4B.

Similarly to the operation of the Uu interface shown in FIG. 3, when using an IAB node, the interference 430 from backhaul link 410 to access link 420 (from IAB donor 402 to UE 406 in FIG. 4A) or the interference from access link 420 to backhaul link 410 (from UE 406 to IAB donor 402 in FIG. 4B) may cause a data reception performance deterioration for the UE 406 or the IAB donor 402.

In previously known communication techniques (e.g., communications according to LTE or NR standards), a UE can be configured with a time-frequency resource for interference measurement, referred to as a CSI-IM resource. CSI-IM resources can be periodic or semi-persistent. That is, a UE can be configured with a CSI-IM resource that is periodic and the UE reports CSI measured on the frequency resources included in the CSI-IM resource on a periodic basis, or a UE can be configured with a CSI-IM resource that is semi-persistent and the UE reports CSI measured on the frequency resources included in the CSI-IM resource on a semi-persistent basis. No data or signal is sent to the UE from the base station via the time-frequency resources included in the CSI-IM resource, so that the UE can take these occasions to measure the interference, and then use the measurement result in CSI generation. For one CSI report, a non-zero power (NZP) CSI reference signal (CSI-RS) resource is associated with a CSI-IM resource.

According to aspects of the present disclosure, assigning CSI-IM resources for a UE to measure interference is not suitable to measure the UE-to-UE interference in full-duplex communications systems, for the following reasons. The CSI-IM resource is designed to measure the overall interference from the environment that is suffered by a UE. But the UE-to-UE interference in full-duplex may be variable, depending on different aggressor UE hypotheses. That is, the UE-to-UE interference in full-duplex may vary, depending on which other UEs are transmitting. Since one CSI-IM resource cannot support the measurement of multiple distinguishable aggressor UEs, measuring CSI with multiple possible aggressor UE hypotheses using CSI-IM resources consumes multiple CSI-IM resources, which may be a significant loss to the network.

In previously known techniques, CSI-IM may only be configured in downlink slots, but signals sent by aggressor UEs are in uplink slots. In one cell, configuring some UEs to use a slot as a downlink slot and configuring other UEs to use the same slot as an uplink slot (i.e., in order to enable a UE to measure interference in a CSI-IM resource while another UE is transmitting) has a high risk of causing severe interference. And this behavior may not be supported by some legacy UEs or low-cost UEs (e.g., machine-type communication (MTC) UEs).

In aspects of the present disclosure, in a cell activating full-duplex communications, a UE configured to receive a DL transmission in a period (e.g., a slot) would suffer from co-channel interference from a paired UE transmitting an UL transmission in the same period. The interference strength depends on the distance between these two UEs and on the UL transmit power spectrum by the UE transmitting the UL signal. If the UE receiving the DL transmission has more than one receive antenna and performs coherent antenna reception, the interference strength also depends on the spatial direction of the interference signal.

In NR Release 16 (Rel-16) communications standards, a technique called Cross-Link Interference (CLI) handling is described, which provides an approach for a UE in one cell to measure interference caused to the UE by UEs in other cells. In the described technique, a set of sounding reference signal (SRS) resources are configured to both the victim UE and the aggressor UE by the network. Due to the good multiplexing capability of SRS, the victim UE may have little difficulty differentiating SRS from the aggressor UEs. In these SRS resources, the victim UE is configured to measure the strength of SRS signals sent by the aggressor UEs in neighboring cells. Because the two UEs are located in different cells, backhaul data transfer rates and latency restrictions may prevent the victim UE from reporting measurements other than the values of SRS reference signal received power (SRS-RSRP) or CLI received signal strength indicator (CLI-RSSI) based on the measurements to the serving base station of the victim UE. SRS-RSRP and CSLI-RSSI may be generated based on the results of long-term measurements, e.g., in a duration of tens or even hundreds of slots.

To enable the inter-cell SRS measurement described in CLI, information on SRS configuration needs to be transferred via a backhaul link between the base stations serving the victim UE and the aggressor UEs. Due to the restriction of backhaul transfer latency, such information transfer may be limited to enabling CLI in a static or semi-static mode, and thus, the SRS measurement is limited to being configured in a static or semi-static pattern. Therefore, CLI techniques can only be used for long-term interference management, e.g., allocating non-overlapping radio resources to aggressor UE and victim UE, which may be an inefficient use of system capacity when compared with radio resource reuse.

According to aspects of the present disclosure, a CSI report from a UE in a full-duplex communications system is not accurate if the CSI report does not take into account UE-to-UE interference.

In previously known full-duplex communications techniques, a UE receiving a downlink transmission (i.e., a victim UE) on the full-duplex time-frequency resources may be paired with a UE transmitting an uplink transmission (i.e., an aggressor UE) on the full-duplex time-frequency resources. In the previously known techniques, the interference on the full-duplex time-frequency resources from the paired UL UE cannot be neglected when the DL UE (victim UE) determines its CSI report, especially when these two UEs are a short distance apart. Without considering such interference, the report CSI may contain an over-estimated channel quality and an incorrect precoding matrix (i.e., rank indicator (RI), channel quality indicator (CQI), and/or precoding matrix indicator (PMI) are incorrect) and thus lead to a scheduling mistake and a data transfer failure.

In aspects of the present disclosure, due to the large number of UE pairing possibilities (i.e., a large number of UEs that could receive a DL transmission and each be paired with each of the large number of other UEs transmitting an UL transmission), it may be inefficient to configure and execute measurements of the UE-to-UE interference between each pair of aggressor UE and victim UE.

According to aspects of the present disclosure, techniques for configuring and executing UE-to-UE SRS measurement for CSI reporting in full-duplex wireless communications systems are provided.

In aspects of the present disclosure, techniques for configuring and executing CSI reports in full-duplex wireless communications systems are provided.

According to aspects of the present disclosure, the provided techniques for measuring UE-to-UE interference in full-duplex wireless communications systems are executed between UEs in one cell, where dynamic measurement configuration and report configuration based on UE locations and traffic variance are practical, which is different from the previously known CLI techniques (i.e., in the Rel-16 communications standards) that aim to handle inter-cell interference.

In aspects of the present disclosure, based on the provided techniques for dynamic operations, more effective approaches can be taken to further improve the system capacity and reduce the transfer latency, when compared with the prior-art techniques (e.g., CLI).

According to aspects of the present disclosure, a UE receiving a downlink transmission UE (i.e., a victim UE) may receive, from a base station, a CSI report configuration containing at least one first indicator of an associated set of SRS resources. The UE may calculate UE-to-UE interference information by measuring SRS sent by hypothetical aggressor UEs (hypothetical because these UEs are not scheduled to transmit uplink transmissions affecting the victim UE at this point) via SRS resources in the set of SRS resources and then determine CSI that contains at least one of CQI, PMI, and/or RI, based on the calculated UE-to-UE interference information. The UE may then report the determined CSI and optionally a second indicator of the measured SRS resources to the base station.

In aspects of the present disclosure, a BS may send, to a victim UE in a full-duplex communications system, a CSI report configuration containing at least one first indicator of an associated set of SRS resources. The BS may receive a CSI report from the victim UE, wherein the CSI report contains CSI and optionally a second indicator of a set of measured SRS resources. The BS may then select a pair of a victim UE (i.e., a UE to receive a downlink transmission) and an aggressor UE (i.e., a UE to transmit an uplink transmission) in a full-duplex communication. The BS may also determine a transport format (e.g., a modulation and coding scheme (MCS), precoding scheme, spatial diversity scheme, or a spatial multiplexing scheme) for a transmission to the victim UE based on the received CSI report.

Figure 5:
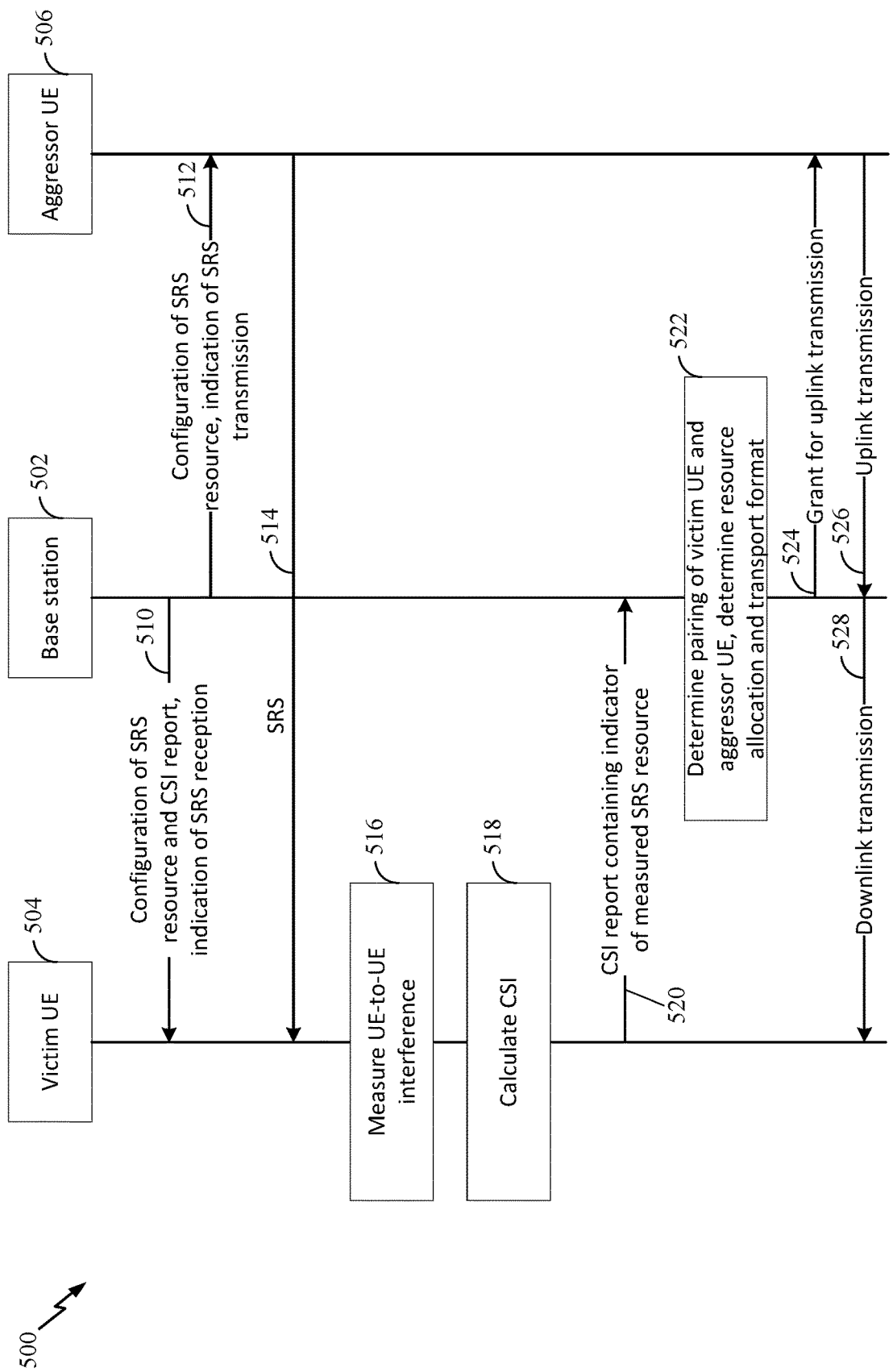
FIG. 5 is an exemplary call flow of a full-duplex wireless communications system, in accordance with certain aspects of the present disclosure.

FIG. 5 is an exemplary call flow 500 of a full-duplex wireless communications system, according to aspects of the present disclosure. The call flow begins with a base station 502 (which may be an example of BS 110a, shown in FIG. 1) sending, at 510, an SRS resource configuration, a CSI report configuration, and an indication that the SRS resource configuration is for reception to victim UE 504. At 512, the BS sends the SRS resource configuration and an indication that the SRS resource configuration is for transmission to aggressor UE 506. The aggressor UE transmits SRS via the configured SRS resources, and the victim UE receives the SRS, at 514. At 516, the victim UE measures the UE-to-UE interference, based on the received SRS. The victim UE then calculates CSI, based on the UE-to-UE interference, at 518. The victim UE transmits a CSI report containing the CSI and an indicator of the measured SRS resources (which may be the SRS resources on which the aggressor UE transmitted the SRS at 514, or a subset of those SRS resources) to the base station at 520. The BS determines to pair the victim UE and the aggressor UE for reception and transmission on an allocation of transmission resources and also determines a transport format for a downlink transmission from the BS to the victim UE at 522. At 524, the BS sends a grant of the transmission resources for an uplink transmission to the aggressor UE. At 526, the aggressor UE transmits the uplink transmission via the transmission resources to the BS. Simultaneously, at 528 the BS transmits a downlink transmission to the victim UE via the transmission resources and using the transport format.

In aspects of the present disclosure, a victim UE may receive an indication from a BS (e.g., a gNB), which configures the SRS resources that are requested to be monitored for SRS reception. The monitor results are used by the UE in reporting CSI feedback.

According to aspects of the present disclosure, if the SRS resource type to be monitored by the UE is periodic, then the indication may be conveyed (e.g., from the BS to the victim UE) by a high-layer (e.g., RRC layer) message. The specific SRS resources that are used for SRS reception may be added into a dedicated RRC configuration message to the victim UE. The RRC configuration message may contain at least the time-frequency position of the SRS resources, a comb offset of the SRS resources, a sequence of the SRS resources, a cyclic shift index of the SRS resources, and a frequency hopping mode.

In aspects of the present disclosure, the configured SRS resource may be identified with an indication of a purpose of either transmission or reception, because the victim UE may also have other SRS resource for SRS transmission when it acts as aggressor UE in other time-frequency resources. In other words, a configured SRS resource for a UE may be used for SRS transmission or SRS reception, so a configuration of an SRS resource may include an indication of whether the UE is to transmit or receive SRS via the configured SRS resource, in aspects of the present disclosure.

According to aspects of the present disclosure, if the SRS resource type is semi-persistent, the specific SRS resources that are used for SRS reception may be added into a dedicated RRC configuration message to the victim UE, and/or part of the SRS resource configuration information may be delivered by a MAC-layer message (e.g., a MAC Control Element (MAC CE)). For example, a MAC CE may contain a list of SRS resources information elements, each of which includes a position of a specific SRS resource and its purpose, i.e., transmission or reception by the UE. For example, a new field may be added in the "SP SRS Activation/Deactivation MAC CE" described in one or more 5G NR standards to indicate whether an activated SRS resource is used for SRS transmission or SRS reception.

In aspects of the present disclosure, if the SRS resource type is aperiodic, the specific SRS resources may be added into a dedicated RRC configuration message, part of the SRS resource configuration information may be delivered by a MAC-layer message, and/or part of the configuration information may also be delivered by a PHY-layer message (e.g., a Downlink Control Information (DCI)).

According to aspects of the present disclosure, a UE-specific DCI (e.g., similar to NR DCI format 0-1) may indicate that a triggered aperiodic CSI report should consider UE-to-UE interference that is associated with certain pre-configured SRS resources. For example, a codepoint in a DCI field, which may be a new codepoint or an existing codepoint that can be reused (e.g., the "CSI request" codepoint) can be used to identify which pre-configured SRS resources are requested to be monitored for UE-to-UE interference measurement. For example, the codepoint equaling 0 means no CSI request; the codepoint equaling 1 means a CSI request for CSI that does not consider intra-cell UE-to-UE interference; the codepoint equaling 2 means a CSI request that considers intra-cell UE-to-UE interference on SRS resource 1; the codepoint equaling 3 means a CSI request for CSI that considers intra-cell UE-to-UE interference on SRS resource 2; etc.

In aspects of the present disclosure, for an aperiodic CSI report which is associated with an aperiodic SRS resource, a time offset period from the occasion where the aperiodic CSI report is triggered (i.e., reception of the request for the aperiodic CSI report) to the occasion where the SRS resource is monitored is indicated to a victim UE. SRS transmission on the same (aperiodic) SRS resource is additionally indicated to an aggressor UE. It may be noted that in the current NR standard, the DCI format 0-1 contains an SRS resource indicator field, but that field is used to indicate SRS resources for transmission by an aggressor UE and not SRS resources for reception by a victim UE.

Figure 6:
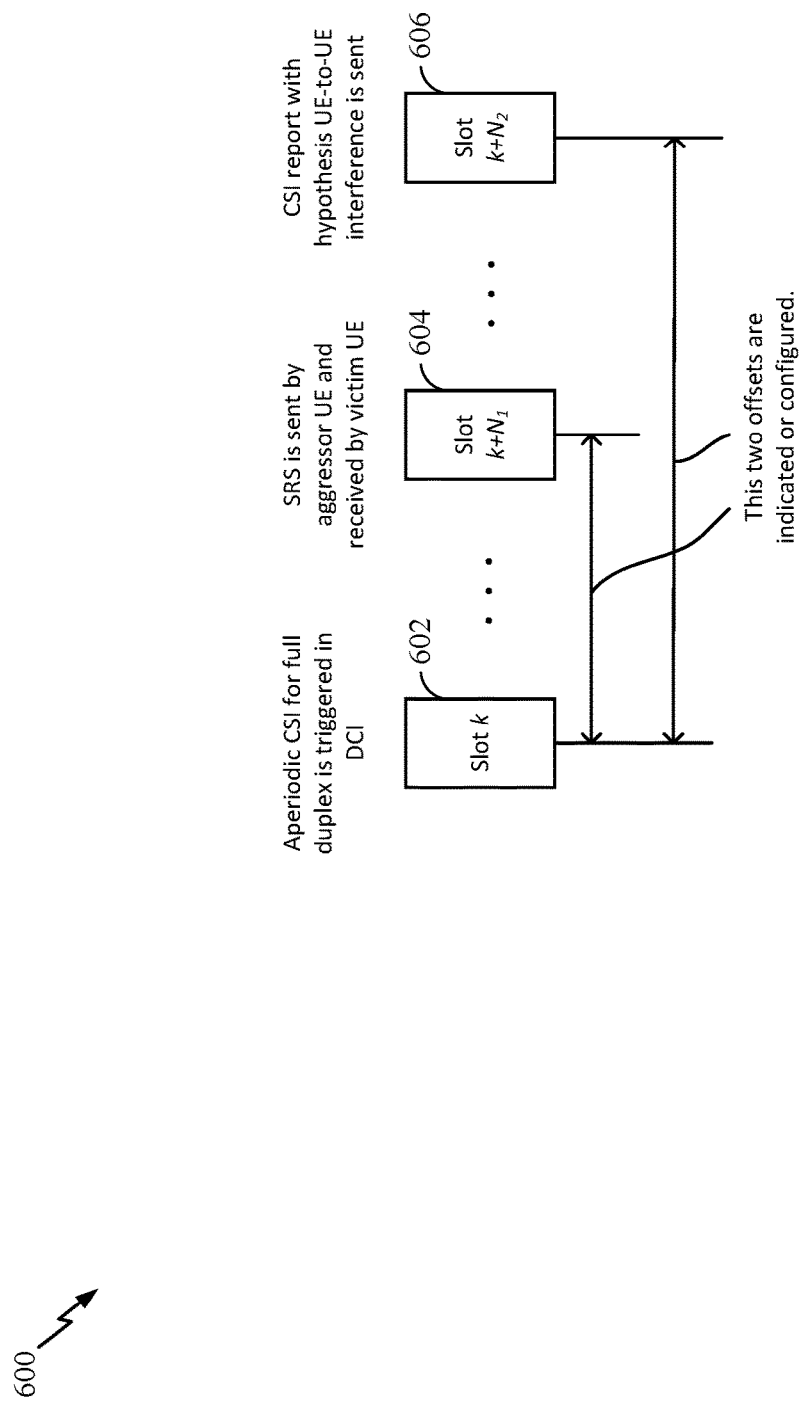
FIG. 6 is an exemplary timeline for triggering of aperiodic SRS transmission, triggering of an aperiodic CSI report, and transmission of the aperiodic CSI report, in accordance with certain aspects of the present disclosure.

FIG. 6 is an exemplary timeline 600 for triggering of aperiodic SRS transmission, triggering of an aperiodic CSI report, and transmission of the aperiodic CSI report, according to aspects of the present disclosure. In a slot k, at 602, a BS (e.g., BS 110a, shown in FIG. 1) transmits a DCI triggering a CSI report for full-duplex from a victim UE (e.g., UE 120a, shown in FIG. 1). In a later slot k+$N_1$, at 604, SRS is transmitted by an aggressor UE (e.g., one of the UEs 120, shown in FIG. 1) and received by the victim UE. At 606, in a still later slot k+$N_2$, the victim UE sends the CSI report with an indication of the measures SRS resources to the BS.

In aspects of the present disclosure, a group-common DCI (e.g., a new DCI similar to NR DCI format 2-3) may indicate which aperiodic SRS are being sent by aggressor UEs. The content in the group-common DCI can contain a plurality of entries (e.g., a bitmap), and the value of each entry may represent whether a corresponding SRS is transmitted or to be transmitted by an aggressor UE. The relationship between the entries and the SRS may be determined by a BS and conveyed to one or more UEs by a high-layer message.

According to aspects of the present disclosure, a group of victim UEs may be configured with a same radio network temporary identifier (RNTI), which may be referred to as a Monitor-SRS-RNTI. The previously mentioned group-common DCI for SRS monitoring may be addressed to this RNTI value. When a victim UE detects this DCI, the UE will read the content of the group-common DCI to determine which SRS resources the UE is to monitor.

In aspects of the present disclosure, a time offset from receiving the group-common DCI to monitoring an SRS resource may be statically configured on a UE via a high-layer message and/or dynamically indicated to one or more UEs in this DCI.

Figure 7:
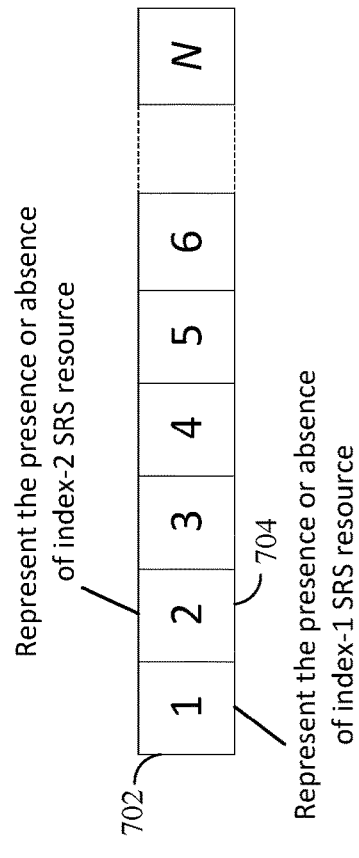
FIG. 7 is an exemplary bitmap for indicating whether SRS are transmitted or are to be transmitted by one or more aggressor UEs, in accordance with certain aspects of the present disclosure.

FIG. 7 is an exemplary bitmap 700 for indicating whether SRS are transmitted or are to be transmitted by one or more aggressor UEs, according to aspects of the present disclosure. The entry at 702 indicates whether SRS are transmitted or are to be transmitted via SRS resources having an index of 1. Similarly, the entry at 704 indicates whether SRS are transmitted or are to be transmitted via SRS resources having an index of 2.

According to aspects of the present disclosure, a victim UE may receive an indication from a BS (e.g., a gNB) regarding a CSI report configuration, which indicates a technique for reporting an SRS Resource Indicator (SRI) for full duplex communication. In a CSI report configuration related high-layer message, a MAC-layer CE, or a PHY-layer DCI, the CSI report configuration may contain an indication of whether intra-cell UE-to-UE interference is to be considered and a CSI report format. For example, a CSI report configuration related high-layer message, a MAC-layer CE, or a PHY-layer DCI, the CSI report configuration may contain a codepoint, where the codepoint equaling 0 indicates the UE is to calculate CSI without considering intra-cell UE-to-UE interference, the codepoint equaling 1 indicates the UE is to calculate CSI considering intra-cell hypothetical (because the UE-to-UE interference does not occur until the transmissions are scheduled and occurring) UE-to-UE interference from a single aggressor UE and the UE reports one wideband SRI associated with one CQI, PMI, and/or RI. In the example, the codepoint equaling 2 indicates the UE is to calculate CSI considering hypothetical intra-cell UE-to-UE interference from multiple simultaneous hypothetical aggressor UEs and the UE reports multiple wideband SRIs associated with one CQI, PMI, and/or RI are reported, where each wideband SRI is associated with one spatial layer in an uplink multi-user multiple-input multiple-output (MU-MIMO) communication from the multiple aggressors. In the example, the codepoint equaling 3 indicates the UE is to calculate CSI considering hypothetical intra-cell UE-to-UE interference from a single hypothetical aggressor UE and the UE is to report one sequence of subband SRIs associated with one CQI, PMI, and/or RI. In the example, the codepoint equaling 4 indicates the UE is to calculate CSI considering hypothetical intra-cell UE-to-UE interference from multiple simultaneous hypothetical aggressor UEs, and the UE is to report multiple sequences of subband SRIs that are associated with one CQI, PMI, and/or RI, where each sequence of subband SRIs is associated with one spatial layer in an uplink MU-MIMO communication from the multiple hypothetical aggressor UEs. In the example, the codepoint equaling 5 indicates the UE is to calculate CSI considering hypothetical intra-cell UE-to-UE interference from a single or multiple simultaneous hypothetical aggressor UEs, and the number of reported SRI associated with one CQI, PMI, and/or RI is determined by the victim UE according to the CSI calculation results. In the hypothesis of any combination of the reported SRIs, the reported CQI, PMI, and/or RI is valid. It may be noted that, in the example, codepoint 2 and 4 are used when uplink MU-MIMO is employed by the aggressor UEs.

In aspects of the present disclosure, if there is only one SRS resource or one set of SRS resources that are configured for measurement by the UE, then the UE does not send an SRI.

According to aspects of the present disclosure, instead of reporting SRI directly, a UE may report the indicator of the associated SRS resource via any other equivalent reporting approaches. For example, if a CSI Resource Indicator (CRI) is linked with a CSI-RS resource and an SRS resource, then a UE may identify the SRS resource by reporting the corresponding CRI (e.g., in a CSI report or a transmission accompanying a CSI report).

In aspects of the present disclosure, an indicator to a sequence of SRS resource set indicators (i.e., an srs-ResourceSetId) and/or a sequence of SRS resources (i.e., an srs-ResourceId) may be configured to be associated with a CSI report configuration. That is, a CSI report configuration may indicate a set of SRS resources by indicating a sequence of SRS resource sit indicators and/or a sequence of SRS resources.

According to aspects of the present disclosure, a power difference between the SRS and a PUSCH transmitted by an aggressor UE may be indicated to a victim UE by a BS. The victim UE may determine the CSI based on the indicated power difference between the SRS and the PUSCH.

In aspects of the present disclosure, active or inactive states of each SRS resource of an aggressor UE may be indicated to a victim UE by a BS. The victim UE may determine the CSI based on the indicated state of the SRS.

According to aspects of the present disclosure, a number of CSIs to report, each of which corresponds to different SRI information, may be indicated to a victim UE. For example, when the number of quantity=3, the victim UE is requested to report at most three CQI, PMI, and/or RI values, each of which corresponds to a number of SRIs, based on the CSI report configuration (e.g., one of the above-described codepoints).

According to aspects of the present disclosure, a victim UE may calculate CSI by assuming the existence of UE-to-UE interference caused by hypothetical aggressor UEs and may then send the CSI report to a BS (e.g., a gNB) according to a received CSI report format. For example, if it is indicated in a CSI report configuration that a hypothetical aggressor UE in full-duplex is present, then the victim UE measures the UE-to-UE interference based on receiving SRS on the indicated SRS resource(s). In the example, the victim UE calculates CSI (e.g. CQI, PMI, and/or RI) and generates SRI by assuming that the measured UE-to-UE interference exists together with a data transfer from the BS in a PDSCH.

In aspects of the present disclosure, if a CSI report on a wideband SRI is requested (e.g., via a CSI report configuration), the victim UE reports the SRI corresponding to UE-to-UE interference that is assumed to exist in the entire frequency band to which the CSI report corresponds.

According to aspects of the present disclosure, if a CSI report on a sequence of subband SRIs is requested (e.g., via a CSI report configuration), the victim UE may report each subband SRI corresponding to the UE-to-UE interference that is assumed to exist in a corresponding frequency subband to which the CSI report corresponds.

In aspects of the present disclosure, if a CSI report on multiple SRIs or sequences of SRIs are requested (e.g., via a CSI report configuration) to support UL MU-MIMO communications, the victim UE reports the SRIs corresponding to UE-to-UE interference that is caused by an uplink MU-MIMO data transfer of aggressor UEs.

According to aspects of the present disclosure, if more than one SRS resource (for a single aggressor UE) or more than one set of SRS resources (for multiple simultaneous aggressor UEs) are configured, then the victim UEs may select some or all of the SRS resources to measure, depending on the UE capability, and thus generating more than one CSI and associated SRI.

In aspects of the present disclosure, a victim UE may send to a BS (e.g., a gNB) a CSI report with a number of calculated CSIs and associated SRIs.

According to aspects of the present disclosure, a victim UE may select those CSIs (of all of the calculated CSIs) that can achieve the largest data rates to report to the BS.

In aspects of the present disclosure, a number of CSIs contained in a CSI report transmitted by a victim UE is not larger than a "quantity" field in a CSI report configuration.

An example of multiple candidates of hypothetical aggressor UEs may be described as follows. In one cell with a high traffic load including uplink and downlink, the network needs to select UEs to carry out downlink or uplink data transfer and determine transport formats for the selected UEs. Full-duplex communication is supported by the base station of the cell. In the cell, each hypothetical aggressor UE (e.g., each UE with uplink traffic) is configured with an SRS resource such that the SRS resources of the hypothetical aggressor UEs are distinguished by the corresponding time-frequency radio resources, cyclic shift values, or comb offsets. The high SRS resource multiplexing degree can improve ratio resource utilization ratio and thus support more hypothetical UE-to-UE interference measurement. The hypothetical aggressor UEs receive indications that the configured SRS resources are for SRS transmission. The victim UEs (e.g., each UE with downlink traffic) are configured, separately or together with a corresponding CSI report configuration, with SRS resources with time-frequency radio resources identical to the time-frequency resources configured on the hypothetical aggressor UEs. The victim UEs receive indications that the configured SRS resources are for SRS reception. Each victim UE performs measurement on a portion of or the full indicated SRS resources, based on the received CSI report configuration. Then, the victim UEs calculate and send the CSI, according to the indicated CSI report format. If the number of hypothetical aggressor UEs is larger than the configured CSI report quantity, then the victim UE selects the configured CSI report quantity of CSI calculation results (with different hypothetical aggressor UEs) and reports the selected CSI. The victim UEs may select for reporting the CSI calculation results that correspond to a highest data transfer rate(s).

In aspects of the present disclosure, the time preserved for CSI computation for a CSI report with hypothetical UE-to-UE interference in full-duplex may be extended when compared with the time preserved for calculation of CSI without hypothetical UE-to-UE interference, because the handling of hypothetical UE-to-UE interference may need more processing time. The specific extended time length may depend on the CSI report format, e.g., how many SRIs are reported.

According to aspects of the present disclosure, the more SRIs are reported (which means the more hypothesis aggressor UEs are considered) by a victim UE, the longer the CSI computation time may be extended.

In aspects of the present disclosure, a time offset (e.g., the number of slots) from triggering of an aperiodic CSI report considering UE-to-UE interference or from the beginning of an associated SRS resource and CSI-RS resource to the time where a CSI report is sent may be increased, as compared to time offsets for CSI reports that do not consider UE-to-UE interference. This time offset may be configured by a base station on a UE. A CSI Processing Unit (CPU) of a UE may be occupied during this duration.

According to aspects of the present disclosure, it may be desirable to increase the accuracy of CSI reports that are used in full-duplex communication by means of the provided methods for a victim UE to report CSI by measuring the hypothetical UE-to-UE interference caused by aggressor UEs. This increased accuracy may result in more suitable transport formats being selected, and thus the transfer reliability in full-duplex communications can be improved. At the same time, the smaller possibility of transfer failure also leads to higher UE throughput.

In aspects of the present disclosure, it may be desirable for a base station to flexibly configure CSI report formats to multiple UEs, regarding whether and how the SRIs are reported. This may enable a base station to improve the scheduling of multiple UEs, including selecting one or more pair of victim UE and aggressor UE, determining resource allocations and transfer modes for victim UEs, and determining UL MU-MIMO configurations for aggressor UEs. Thus, the provided techniques may be used to increase network throughput.

Figure 8:
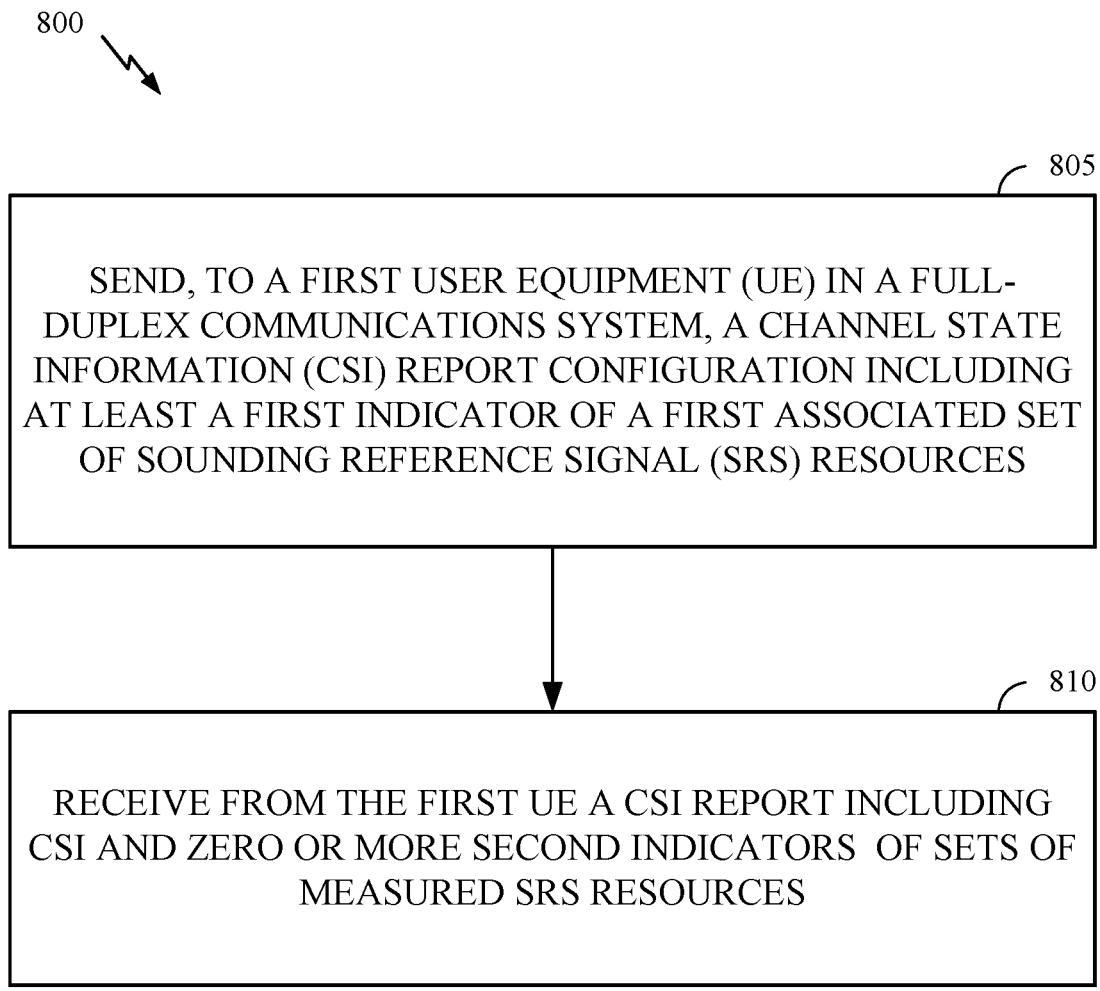
FIG. 8 is a flow diagram illustrating example operations for wireless communication by a base station (BS), in accordance with certain aspects of the present disclosure.

FIG. 8 is a flow diagram illustrating example operations 800 for wireless communication, in accordance with certain aspects of the present disclosure. The operations 800 may be performed, for example, by a BS (e.g., such as a BS 110 in the wireless communication network 100, shown in FIG. 1). Operations 800 may be implemented as software components that are executed and run on one or more processors (e.g., controller/processor 240 of FIG. 2). Further, the transmission and reception of signals by the BS in operations 800 may be enabled, for example, by one or more antennas (e.g., antennas 234 of FIG. 2). In certain aspects, the transmission and/or reception of signals by the BS may be implemented via a bus interface of one or more processors (e.g., controller/processor 240) obtaining and/or outputting signals.

The operations 800 may begin, at block 805, with the BS sending, to a first user equipment (UE) in a full-duplex communications system, a channel state information (CSI) report configuration including at least a first indicator of a first associated set of sounding reference signal (SRS) resources.

Operations 800 may continue, at block 810, by the BS receiving from the first UE a CSI report including CSI and zero or more second indicators of sets of measured SRS resources.

Figure 9:
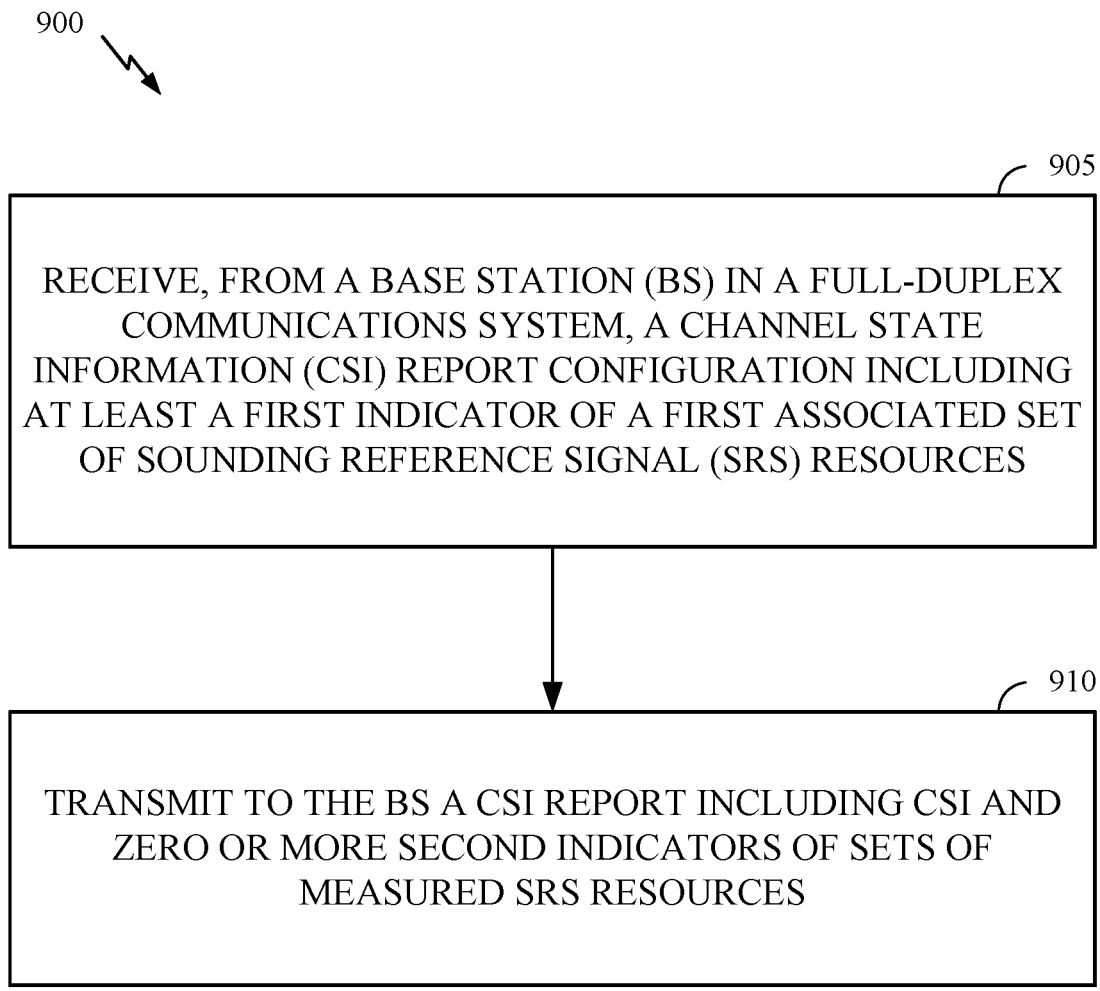
FIG. 9 is a flow diagram illustrating example operations for wireless communication by a user equipment (UE), in accordance with certain aspects of the present disclosure.

FIG. 9 is a flow diagram illustrating example operations 900 for wireless communication, in accordance with certain aspects of the present disclosure. The operations 900 may be performed, for example, by UE (e.g., such as a UE 120 in the wireless communication network 100, shown in FIG. 1). The operations X00 may be complimentary operations by the UE to the operations 900 performed by the BS. Operations 900 may be implemented as software components that are executed and run on one or more processors (e.g., controller/processor 280 of FIG. 2). Further, the transmission and reception of signals by the UE in operations 900 may be enabled, for example, by one or more antennas (e.g., antennas 252 of FIG. 2). In certain aspects, the transmission and/or reception of signals by the UE may be implemented via a bus interface of one or more processors (e.g., controller/processor 280) obtaining and/or outputting signals.

The operations 900 may begin, at block 905, by the UE receiving, from a base station (BS) in a full-duplex communications system, a channel state information (CSI)

report configuration including at least a first indicator of a first associated set of sounding reference signal (SRS) resources.

Operations 900 may continue, at block 910, with the UE transmitting to the BS a CSI report including the CSI and zero or more second indicators of sets of measured SRS resources.

Figure 10:
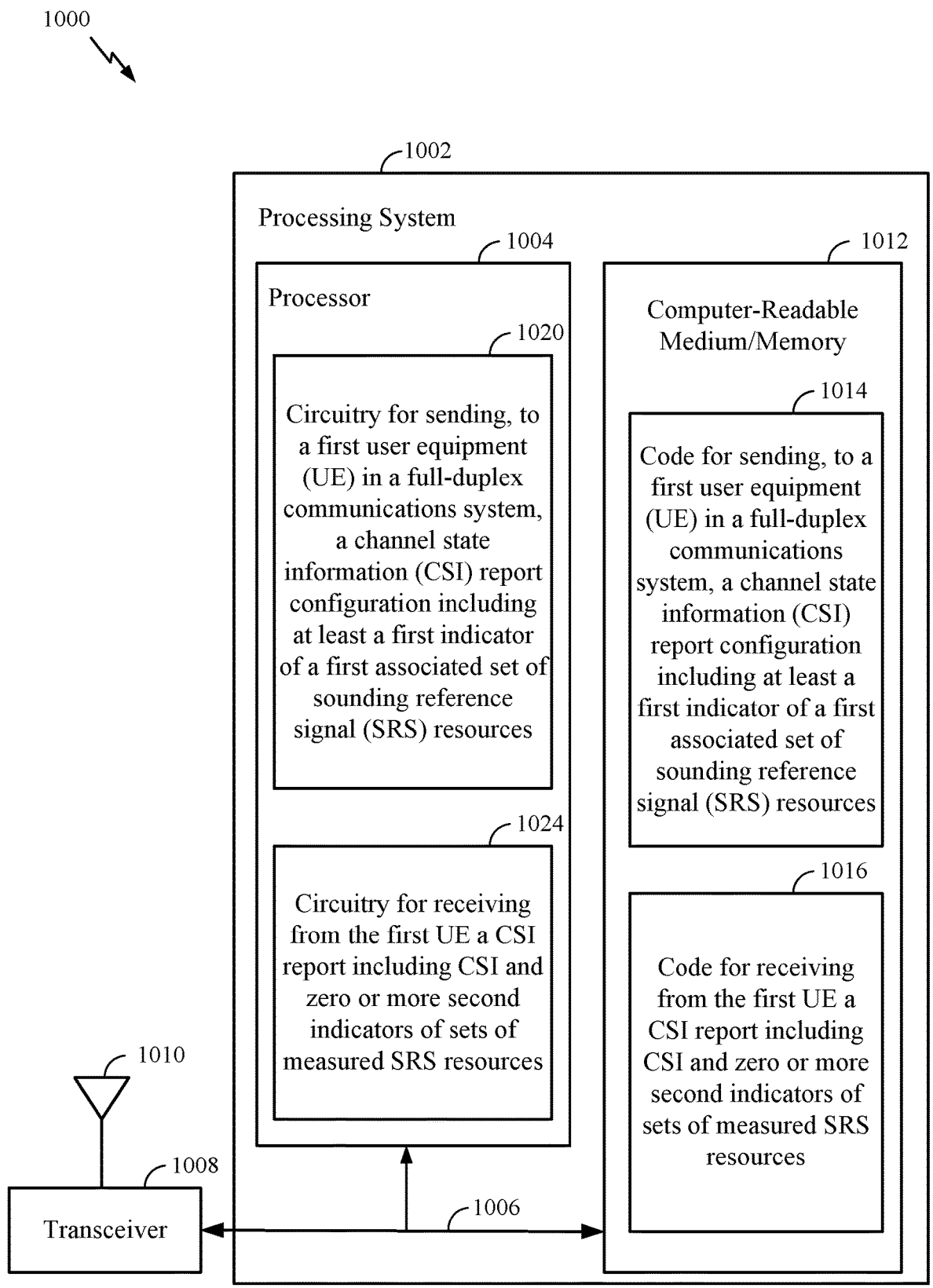
FIG. 10 illustrates a communications device that may include various components configured to perform operations for the techniques disclosed herein in accordance with aspects of the present disclosure.

FIG. 10 illustrates a communications device 1000 that may include various components (e.g., corresponding to means-plus-function components) configured to perform operations for the techniques disclosed herein, such as the operations illustrated in FIG. 8. The communications device 1000 includes a processing system 1002 coupled to a transceiver 1008. The transceiver 1008 is configured to transmit and receive signals for the communications device 1000 via an antenna 1010, such as the various signals as described herein. The processing system 1002 may be configured to perform processing functions for the communications device 1000, including processing signals received and/or to be transmitted by the communications device 1000.

The processing system 1002 includes a processor 1004 coupled to a computer-readable medium/memory 1012 via a bus 1006. In certain aspects, the computer-readable medium/memory 1012 is configured to store instructions (e.g., computer-executable code) that when executed by the processor 1004, cause the processor 1004 to perform the operations illustrated in FIG. 8, or other operations for performing the various techniques discussed herein for configuring CSI reporting in a full-duplex communication system. In certain aspects, computer-readable medium/memory 1012 stores code 1014 for sending, to a first user equipment (UE) in a full-duplex communications system, a channel state information (CSI) report configuration including at least a first indicator of a first associated set of sounding reference signal (SRS) resources and code 1016 for receiving from the first UE a CSI report including CSI and zero or more second indicators of sets of measured SRS resources. In certain aspects, the processor 1004 has circuitry configured to implement the code stored in the computer-readable medium/memory 1012. The processor 1004 includes circuitry 1020 for sending, to a first user equipment (UE) in a full-duplex communications system, a channel state information (CSI) report configuration including at least a first indicator of a first associated set of sounding reference signal (SRS) resources and circuitry 1024 for receiving from the first UE a CSI report including CSI and zero or more second indicators of sets of measured SRS resources.

Figure 11:
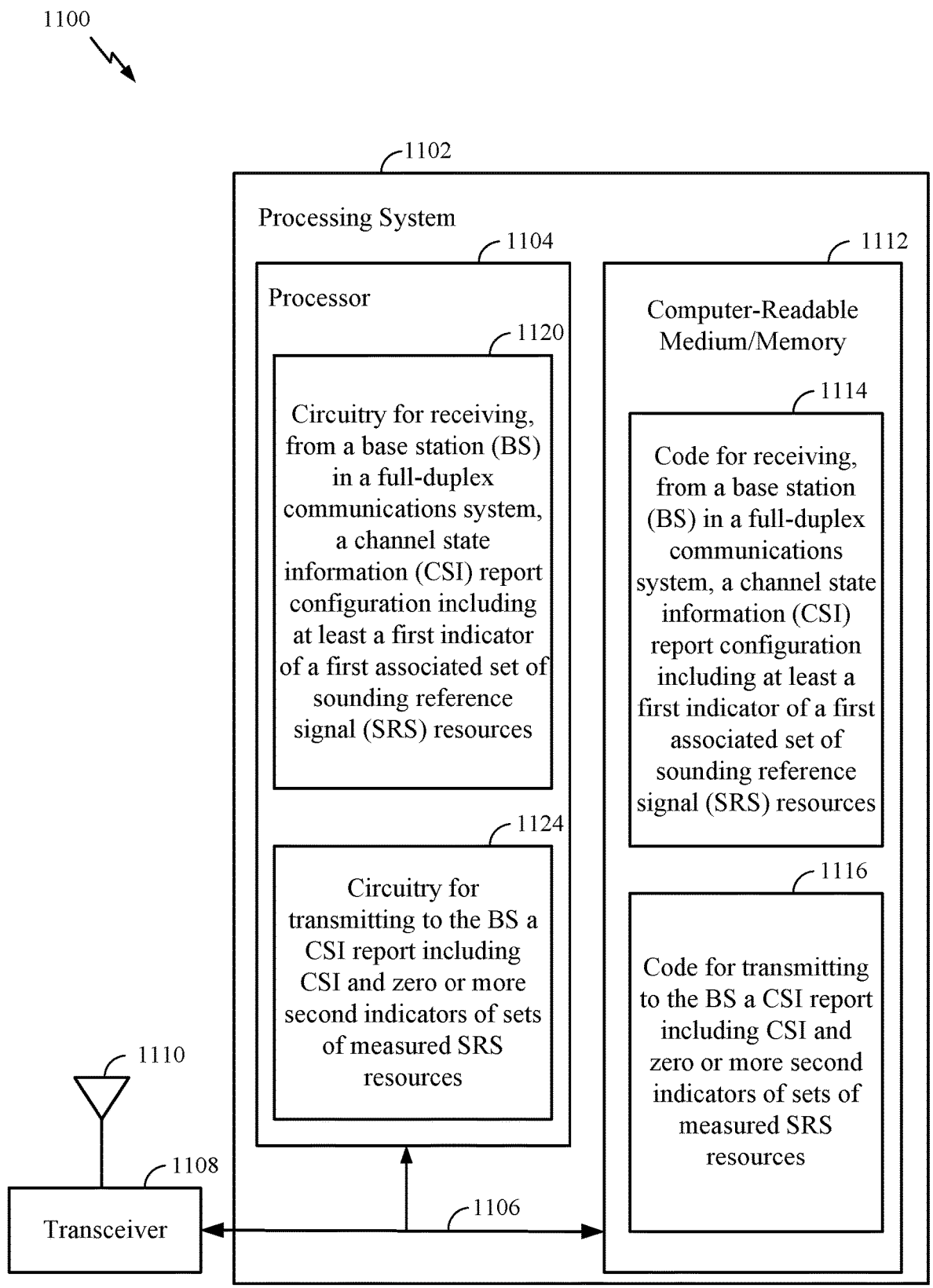
FIG. 11 illustrates a communications device that may include various components configured to perform operations for the techniques disclosed herein in accordance with aspects of the present disclosure.

FIG. 11 illustrates a communications device 1100 that may include various components (e.g., corresponding to means-plus-function components) configured to perform operations for the techniques disclosed herein, such as the operations illustrated in FIG. 9. The communications device 1100 includes a processing system 1102 coupled to a transceiver 1108. The transceiver 1108 is configured to transmit and receive signals for the communications device 1100 via an antenna 1110, such as the various signals as described herein. The processing system 1102 may be configured to perform processing functions for the communications device 1100, including processing signals received and/or to be transmitted by the communications device 1100.

The processing system 1102 includes a processor 1104 coupled to a computer-readable medium/memory 1112 via a bus 1106. In certain aspects, the computer-readable medium/memory 1112 is configured to store instructions (e.g., computer-executable code) that when executed by the processor 1104, cause the processor 1104 to perform the operations illustrated in FIG. 9, or other operations for performing the various techniques discussed herein for reporting CSI for a full-duplex communications system. In certain aspects, computer-readable medium/memory 1112 stores code 1114 for receiving, from a base station (BS) in a full-duplex communications system, a channel state information (CSI) report configuration including at least a first indicator of a first associated set of sounding reference signal (SRS) resources and code 1116 for transmitting to the BS a CSI report including CSI and zero or more second indicators of sets of measured SRS resources. In certain aspects, the processor 1004 has circuitry configured to implement the code stored in the computer-readable medium/memory 1012. The processor 1004 includes circuitry 1120 for receiving, from a base station (BS) in a full-duplex communications system, a channel state information (CSI) report configuration including at least a first indicator of a first associated set of sounding reference signal (SRS) resources and circuitry 1124 for transmitting to the BS a CSI report including CSI and zero or more second indicators of sets of measured SRS resources.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims.

EXAMPLE EMBODIMENTS

Embodiment 1: A method for wireless communications by a base station, comprising sending, to a first user equipment (UE) in a full-duplex communications system, a channel state information (CSI) report configuration including at least a first indicator of a first associated set of sounding reference signal (SRS) resources; and receiving from the first UE a CSI report including CSI and zero or more second indicators of sets of measured SRS resources.

Embodiment 2: The method of Embodiment 1, wherein sending the CSI report configuration comprises: sending a radio resource configuration (RRC) layer message to the UE, wherein the RRC message comprises at least one of a time-frequency position, a comb offset, a sequence, a cyclic shift index, or a frequency hopping mode regarding the first associated set of SRS resources.

Embodiment 3: The method of Embodiment 2, wherein the RRC layer message further comprises an indication that the first associated set of SRS resources is used for SRS reception or interference management.

Embodiment 4: The method of Embodiment 1, wherein the first associated set of SRS resources comprises at least one of a set of semi-persistent SRS resources or a set of aperiodic SRS resources, and the Embodiment further comprises: sending a medium access control (MAC) layer message comprising at least one of a time-frequency position, a comb offset, a sequence, a cyclic shift index, a frequency hopping mode regarding the first associated set of SRS resources, and an indication of activation or deactivation of the first associated set of SRS resources.

Embodiment 5: The method of Embodiment 4, wherein the MAC layer message further comprises an indication that the first associated set of SRS resources is used for SRS reception or interference management.

Embodiment 6: The method of Embodiment 1, wherein the first associated set of SRS resources comprises a set of aperiodic SRS resources, and the Embodiment further comprises: transmitting a downlink control information (DCI) to the first UE requesting the first UE to transmit the CSI report as an aperiodic CSI report, wherein the DCI comprises an indication to the first UE to measure interference from a second UE at the first associated set of SRS resources and determine the CSI based on the measured interference.

Embodiment 7: The method of Embodiment 6, further comprising: configuring a time offset between reception of the DCI and measuring of the interference in a RRC layer message, a MAC layer message, the DCI, or another DCI.

Embodiment 8: The method of any of Embodiments 6-7, wherein the DCI further comprises an indication that the first associated set of SRS resources is used for SRS reception or interference management.

Embodiment 9: The method of any of Embodiments 6-8, wherein the DCI comprises a group-common DCI having a cyclic redundancy check (CRC) masked with a radio network temporary identifier (RNTI), and the Embodiment further comprises: assigning the RNTI to a group of UEs including the first UE.

Embodiment 10: The method of any of Embodiment 9, wherein the first indicator comprises a value of an entry in a plurality of entries corresponding to a set of SRS resources.

Embodiment 11: The method of any of Embodiments 1-10, further comprising: configuring a time offset between reception of the DCI and measuring of the interference is configured in a RRC layer message, a MAC layer message, the DCI, or another DCI.

Embodiment 12: The method of any of Embodiments 1-11, wherein the CSI report configuration comprises: an indication to the first UE to calculate the CSI based on an interference measurement on a wideband SRS from a second UE.

Embodiment 13: The method of any of Embodiments 1-11, wherein the CSI report configuration comprises: an indication to the first UE to calculate the CSI based on an interference measurement on a plurality of wideband SRSs from a plurality of second UEs, wherein each wideband SRS is associated with one spatial layer in an uplink multi-user multiple-input multiple-output (MU-MIMO) communication.

Embodiment 14: The method of any of Embodiments 1-11, wherein the CSI report configuration comprises: an indication to the first UE to calculate the CSI, wherein whether calculating CSI is based on an interference measurement on a first wideband SRS from a second UE or based on an interference measurement on a plurality of second wideband SRSs from a plurality of second UEs is determined by the first UE, wherein each second wideband SRS is associated with one spatial layer in an uplink multi-user multiple-input multiple-output (MU-MIMO) communication.

Embodiment 15: The method of any of Embodiments 1-11, wherein the CSI report configuration comprises: an indication to the first UE to calculate the CSI based on an interference measurement on a sequence of subband SRSs from a plurality of second UEs, wherein each subband SRS is sent from one of the second UEs.

Embodiment 16: The method of any of Embodiments 1-11, wherein the CSI report configuration comprises: an indication to the first UE to calculate the CSI based on an interference measurement on a plurality of sequences of subband SRSs from a plurality of second UEs, wherein each sequence of subband SRSs is associated with one spatial layer in an uplink multi-user multiple-input multiple-output (MU-MIMO) communication, and each subband SRS of each sequence is sent from one of second UEs.

Embodiment 17: The method of any of Embodiments 1-11, wherein the CSI report configuration comprises: an indication to the first UE to calculate the CSI, wherein whether calculating CSI is based on an interference measurement on a sequence of first subband SRSs from a plurality of second UEs or based on an interference measurement on a plurality of sequences of second subband SRSs from a plurality of second UEs is determined by the first UE, wherein each first subband SRS is sent from one of the second UEs, and wherein each sequence of second subband SRSs is associated with one spatial layer in an uplink multi-user multiple-input multiple-output (MU-MIMO) communication and each second subband SRS of each sequence is sent from one of second UEs.

Embodiment 18: The method of any of Embodiments 1-11, wherein the CSI report configuration comprises: an indication to the first UE to calculate the CSI based on a plurality of SRSs from a plurality of second UEs and to determine a number of indicators of sets of SRS resources to report to the BS with the CSI report, based on the calculated CSI.

Embodiment 19: The method of any of Embodiments 1-11, wherein the CSI report configuration includes only one first indicator and wherein determining the number of second indicators comprises determining the number of second indicators is zero.

Embodiment 20: The method of any of Embodiments 1-19, further comprising: signaling a power difference, between the SRS and a physical uplink shared channel (PUSCH) transmitted by a second UE, to the first UE, wherein calculating the CSI is based on the power difference.

Embodiment 21: The method of any of Embodiments 1-20, further comprising: signaling a state of the first associated set of SRS resources of a second UE to the first UE, wherein calculating the CSI is based on the state.

Embodiment 22: The method of any of Embodiments 1-21, wherein the CSI report configuration indicates a quantity of CSI reports, wherein each CSI report is associated with one of a plurality of sets of SRS resources, for the first UE to send.

Embodiment 23: The method of any of Embodiments 1-22, further comprising: receiving from the first UE a plurality of CSI reports that each includes CSI and a plurality of second indicators of SRS resources.

Embodiment 24: The method of any of Embodiments 1-22, further comprising: receiving, from the first UE, another CSI report including CSI and an indication of a wideband SRS from a second UE.

Embodiment 25: The method of any of Embodiments 1-22, further comprising: receiving, from the first UE, a plurality of other CSI reports, each including CSI and an indication of a plurality of wideband SRSs, from a plurality of second UEs, wherein each wideband SRS is associated with one spatial layer in an uplink MU-MIMO communication.

Embodiment 26: The method of any of Embodiments 1-22, further comprising: receiving, from the first UE, a plurality of other CSI reports, each including CSI and an indication of a sequence of subband SRSs, from a plurality of second UEs, wherein each subband SRS is sent from one of the second UEs.

Embodiment 27: The method of any of Embodiments 1-22, further comprising: receiving, from the first UE, a plurality of other CSI reports, each including CSI and an indication of a plurality of sequences of subband SRSs, from a plurality of second UEs, wherein each sequence of subband SRSs is associated with one spatial layer in an uplink multi-user multiple-input multiple-output (MU-MIMO) communication, and each subband SRS of each sequence is sent from one of the second UEs.

Embodiment 28: The method of any of Embodiments 1-27, wherein the CSI report includes at least one of: a CSI-RS resource indicator (CRI), an SRS resource indicator (SRI), or a channel quality value (e.g., a signal-to-interference-and-noise-ratio (SINR) for the channel).

Embodiment 29: The method of any of Embodiments 1-26, further comprising: determining the first UE is a victim UE and a second UE is an aggressor UE in a pair of UEs in the full-duplex communications system, based on the CSI report, wherein the second UE transmitted an SRS via the first associated set of SRS resources.

Embodiment 30: The method of any of Embodiment 29, wherein determining the first UE is the victim UE and the second UE is the aggressor UE in the pair of UEs is based on at least one of: a weighted sum of a first signal-to-interference-and-noise-ratio (SINR) between the first UE and the BS and a second SINR between the second UE and the BS, or a weighted sum of a first data rate from the BS to the first UE and a second data rate from the second UE to the BS.

Embodiment 31: The method of any of Embodiments 1-30, further comprising: determining a transport format for the first UE based on the received CSI report.

Embodiment 32: The method of Embodiment 31, wherein the transport format comprises at least one of a modulation and coding scheme (MCS), a layer mapping scheme, a precoding scheme, a spatial diversity scheme, a spatial multiplexing scheme, a beamforming scheme, or a resource mapping scheme.

Embodiment 33: The method of Embodiment 31, further comprising: transmitting a downlink transmission to the first UE according to the transport format.

Embodiment 34: A method for wireless communications by a first user equipment (UE), comprising: receiving, from a base station (BS) in a full-duplex communications system, a channel state information (CSI) report configuration including at least a first indicator of a first associated set of sounding reference signal (SRS) resources; and transmitting to the BS a CSI report including CSI and zero or more second indicators of sets of measured SRS resources.

Embodiment 35: The method of Embodiment 34, wherein receiving the CSI report configuration comprises: receiving a radio resource configuration (RRC) layer message from the BS, wherein the RRC layer message comprises at least one of a time-frequency position, a comb offset, a sequence, a cyclic shift index, or a frequency hopping mode regarding the first associated set of SRS resources.

Embodiment 36: The method of Embodiment 35, wherein the RRC layer message further comprises an indication that the first associated set of SRS resources is used for SRS reception.

Embodiment 37: The method of Embodiment 34, wherein the first associated set of SRS resources comprises at least one of a set of semi-persistent SRS resources or a set of aperiodic SRS resources, and the method further comprises: receiving a medium access control (MAC) layer message comprising at least one of a time-frequency position, a comb offset, a sequence, a cyclic shift index, and a frequency hopping mode regarding the first associated set of SRS resources and an indication of activation or deactivation of the first associated set of SRS resources.

Embodiment 38: The method of Embodiment 37, wherein the MAC layer message further comprises an indication that the first associated set of SRS resources is used for SRS reception.

Embodiment 39: The method of Embodiment 34, wherein the first associated set of SRS resources comprises a set of aperiodic SRS resources, and the method further comprises: receiving a downlink control information (DCI) from the BS requesting the first UE to transmit the CSI report as an aperiodic CSI report, wherein the DCI comprises an indication to the UE to measure interference from a second UE at the first associated set of SRS resources and determine the CSI based on the measured interference.

Embodiment 40: The method of Embodiment 39, wherein a time offset between reception of the DCI and measuring of the interference is configured in a RRC layer message, a MAC layer message, the DCI or another DCI.

Embodiment 41: The method of Embodiment 39, wherein the DCI further comprises an indication that the first associated set of SRS resources is used for SRS reception.

Embodiment 42: The method of Embodiment 39, wherein the DCI comprises a group-common DCI having a cyclic redundancy check (CRC) masked with a radio network temporary identifier (RNTI), and the method further comprises: obtaining an assignment of the RNTI to a group of UEs including the first UE.

Embodiment 43: The method of Embodiment 42, wherein the first indicator comprises a value of an entry in a plurality of entries corresponding to a set of SRS resources.

Embodiment 44: The method of Embodiment 42, wherein a time offset between reception of the DCI and measuring of the interference is configured in a RRC layer message, a MAC layer message, the DCI, or another DCI.

Embodiment 45: The method of any of Embodiments 34-44, wherein the CSI report configuration comprises: an indication to the first UE to calculate the CSI based on the interference measurement on a wideband SRS from a second UE.

Embodiment 46: The method of any of Embodiments 34-44, wherein: the CSI report configuration comprises an indication to the first UE to calculate the CSI based on an interference measurement on a plurality of wideband SRSs from a plurality of second UEs; and each wideband SRS is associated with one spatial layer in an uplink multi-user multiple-input multiple-output (MU-MIMO) communication.

Embodiment 47: The method of any of Embodiments 34-44, wherein: the CSI report configuration comprises an indication to the first UE to calculate the CSI based on an interference measurement on a plurality of subband SRSs from a plurality of second UEs, wherein each subband SRS is sent from one of the second UEs.

Embodiment 48: The method of any of Embodiments 34-44, wherein the CSI report configuration comprises an indication to the first UE to calculate the CSI based on an interference measurement on a plurality of sequences of subband SRSs from a plurality of second UEs, wherein each sequence of subband SRSs is associated with one spatial layer in an uplink multi-user multiple-input multiple-output (MU-MIMO) communication and each subband SRS of each sequence is sent from one of the second UEs.

Embodiment 49: The method of any of Embodiments 34-44, wherein the CSI report configuration comprises an indication to the first UE to calculate the CSI based on a plurality of SRSs from a plurality of second UEs and to determine a number of indicators of sets of SRS resources to report to the BS with the CSI report, based on the calculated CSI, and the method further comprises: determining the number of second indicators of sets of measured SRS resources to report to the BS with the CSI report, based on the calculated CSI.

Embodiment 50: The method of any of Embodiments 34-44, wherein the CSI report configuration includes only one first indicator and wherein the number of second indicators is zero.

Embodiment 51: The method of any of Embodiments 34-44, wherein the CSI report configuration comprises an indication to the first UE to calculate the CSI based on a plurality of SRSs from a plurality of second UEs and to determine a number of indicators of sets of SRS resources to report to the BS with the CSI report, based on the calculated CSI.

Embodiment 52: The method of Embodiment 51, further comprising: selecting a subset of the plurality of SRSs to report, based on data rates corresponding to each of the SRSs in the plurality of SRSs.

Embodiment 53: The method of any of Embodiments 34-52, further comprising: receiving a power difference, between the SRS and a physical uplink shared channel (PUSCH) transmitted by a second UE, from the BS; and calculating the CSI based on the power difference.

Embodiment 54: The method of any of Embodiments 34-53, further comprising: receiving a state of the first associated set of SRS resources of a second UE from the BS; and calculating the CSI based on the state.

Embodiment 55: The method of any of Embodiments 34-55, wherein the CSI report configuration indicates a quantity of CSI reports, wherein each CSI report is associated with one of a plurality of sets of SRS resources, for the first UE to send.

Embodiment 56: The method of any of Embodiments 34-55, further comprising: transmitting to the BS a plurality of CSI reports that each includes CSI and a plurality of second indicators of SRS resources.

Embodiment 57: The method of any of Embodiments 34-55, further comprising: transmitting to the BS another CSI report including CSI and an indication of a wideband SRS from a second UE.

Embodiment 58: The method of any of Embodiments 34-55, further comprising: transmitting to the BS a plurality of other CSI reports, each including CSI and an indication of a plurality of wideband SRSs, from a plurality of second UEs, wherein each wideband SRS is associated with one spatial layer in an uplink MU-MIMO communication.

Embodiment 59: The method of any of Embodiments 34-55, further comprising: transmitting to the BS a plurality of other CSI reports, each including CSI and an indication of a sequence of subband SRSs, from a plurality of second UEs, wherein each subband SRS is sent from one of the second UEs.

Embodiment 60: The method of any of Embodiments 34-59, wherein the CSI report comprises at least one of: a CSI-RS resource indicator (CRI), an SRS resource indicator (SRI), or a channel quality value (e.g., a signal-to-interference-and-noise-ratio (SINR) for the channel).

Embodiment 61: The method of any of Embodiments 34-55, further comprising: transmitting to the BS a plurality of other CSI reports, each including CSI and an indication of a plurality of sequences of subband SRSs, from a plurality of second UEs, wherein each sequence of subband SRSs is associated with one spatial layer in an uplink multi-user multiple-input multiple-output (MU-MIMO) communication, and each subband SRS of each sequence is sent from one of the second UEs.

Embodiment 62: The method of any of Embodiments 34-61, further comprising: measuring an SRS sent by a second UE on the first associated set of SRS resources; calculating UE-to-UE interference information based on the measurements of the SRS; and determining the CSI based on the calculated UE-to-UE interference information and the CSI report configuration.

Embodiment 63: The method of any of Embodiments 34-62, further comprising: measuring a plurality of wideband SRSs sent by a plurality of second UEs on the first associated set of SRS resources, wherein each wideband SRS is associated with one spatial layer in an uplink multi-user multiple-input multiple-output (MU-MIMO) communication; calculating UE-to-UE interference information based on the measurements of the SRS; and determining the CSI based on the calculated UE-to-UE interference information and the CSI report configuration.

Embodiment 64: The method of any of Embodiments 34-63, wherein the CSI comprises at least one of a channel quality indicator (CQI), a precoding matrix indicator (PMI), or a rank indicator (RI).

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal 120 (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein. For example, instructions for performing the operations described herein and illustrated in FIGS. 8-9.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g.,

RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. A method for wireless communications by a first user equipment (UE), comprising:
   receiving, from a base station (BS) in a full-duplex communications system, a channel state information (CSI) report configuration, wherein the CSI report configuration comprises a first indicator of a first associated set of sounding reference signal (SRS) resources, and wherein the CSI report configuration comprises an indication to the first UE to calculate CSI based on a plurality of SRSs corresponding to a plurality of second UEs and to determine, based on the calculated CSI, a number of second indicators of sets of measured SRS resources to report to the BS with a CSI report;
   determining, based on the calculated CSI, the number of second indicators of sets of measured SRS resources to report to the BS with the CSI report; and
   transmitting to the BS the CSI report including the CSI and zero or more of the number of second indicators of sets of measured SRS resources.

2. The method of claim 1, wherein receiving the CSI report configuration comprises:
   receiving a radio resource configuration (RRC) layer message from the BS, wherein the RRC layer message comprises an indication that the first associated set of SRS resources is used for SRS reception and at least one of a time-frequency position, a comb offset, a sequence, a cyclic shift index, or a frequency hopping mode regarding the first associated set of SRS resources.

3. The method of claim 1, wherein the first associated set of SRS resources comprises at least one of a set of semi-persistent SRS resources or a set of aperiodic SRS resources, and the method further comprises:
   receiving a medium access control (MAC) layer message comprising an indication that the first associated set of SRS resources is used for SRS reception and at least one of a time-frequency position, a comb offset, a sequence, a cyclic shift index, and a frequency hopping mode regarding the first associated set of SRS resources and an indication of activation or deactivation of the first associated set of SRS resources.

4. The method of claim 1, wherein the CSI report configuration includes only one first indicator and wherein the number of second indicators is zero.

5. The method of claim 1, wherein the CSI report comprises at least one of: a CSI-RS resource indicator (CRI), an SRS resource indicator (SRI), or a channel quality value.

6. The method of claim 1, wherein the CSI comprises at least one of a channel quality indicator (CQI), a precoding matrix indicator (PMI), or a rank indicator (RI).

7. A method for wireless communications by a first user equipment (UE), comprising:
   receiving, from a base station (BS) in a full-duplex communications system, a channel state information (CSI) report configuration, wherein the CSI report configuration comprises a first indicator of a first associated set of sounding reference signal (SRS) resources, and wherein the CSI report configuration comprises an indication to the first UE to calculate CSI based on a plurality of SRSs corresponding to a plurality of second UEs and to determine, based on the calculated CSI, a number of indicators of sets of SRS resources to report to the BS with a CSI report; and
   transmitting to the BS the CSI report including the CSI and zero or more of the number of indicators of sets of SRS resources.

8. The method of claim 7, further comprising:
   selecting a subset of the plurality of SRSs to report, based on data rates corresponding to each of the SRSs in the plurality of SRSs.

9. A method for wireless communications by a first user equipment (UE), comprising:
   receiving, from a base station (BS) in a full-duplex communications system, a channel state information (CSI) report configuration comprising a first indicator of a first associated set of sounding reference signal (SRS) resources;
   transmitting to the BS a CSI report including CSI and zero or more second indicators of sets of measured SRS resources; and
   transmitting to the BS a plurality of other CSI reports, each including CSI and an indication of a plurality of wideband SRSs corresponding to a plurality of second UEs, wherein each wideband SRS is associated with one spatial layer in an uplink MU-MIMO communication.

10. A method for wireless communications by a first user equipment (UE), comprising:
    receiving, from a base station (BS) in a full-duplex communications system, a channel state information (CSI) report configuration comprising a first indicator of a first associated set of sounding reference signal (SRS) resources;
    transmitting to the BS a CSI report including CSI and zero or more second indicators of sets of measured SRS resources; and
    transmitting to the BS a plurality of other CSI reports, each including CSI and an indication of a sequence of subband SRSs corresponding to a plurality of second UEs, wherein each subband SRS corresponds to one of the second UEs.

11. A method for wireless communications by a first user equipment (UE), comprising:
    receiving, from a base station (BS) in a full-duplex communications system, a channel state information (CSI) report configuration comprising a first indicator of a first associated set of sounding reference signal (SRS) resources;
    transmitting to the BS a CSI report including CSI and zero or more second indicators of sets of measured SRS resources; and
    transmitting to the BS a plurality of other CSI reports, each including CSI and an indication of a plurality of sequences of subband SRSs corresponding to a plurality of second UEs, wherein each sequence of subband SRSs is associated with one spatial layer in an uplink multi-user multiple-input multiple-output (MU- MIMO) communication, and wherein each subband SRS of each sequence corresponds to one of the second UEs.

\* \* \* \* \*